(12) United States Patent
Guo et al.

(10) Patent No.: US 8,934,784 B2
(45) Date of Patent: Jan. 13, 2015

(54) METHODS AND DEVICES FOR TRANSMITTING/OBTAINING INFORMATION BY VISIBLE LIGHT SIGNAL

(71) Applicant: Zhuhai Hengqin Great Aim Visible Light Communication Technology Co. Ltd., Zhuhai City (CN)

(72) Inventors: Cheng Guo, Beijing (CN); Hong Hu, Beijing (CN)

(73) Assignee: Zhuhai Hengqin Great Aim Visible Light Communication Technology Co. Ltd., Zhuhai (CN)

( * ) Notice: Subject to any disclaimer, the term of this patent is extended or adjusted under 35 U.S.C. 154(b) by 0 days.

(21) Appl. No.: 14/246,503

(22) Filed: Apr. 7, 2014

(65) Prior Publication Data

US 2014/0301737 A1    Oct. 9, 2014

(30) Foreign Application Priority Data

Apr. 9, 2013   (CN) .......................... 2013 1 0121480

(51) Int. Cl.
   *H04B 10/116*   (2013.01)
(52) U.S. Cl.
   CPC .................................. *H04B 10/116* (2013.01)
   USPC ......................................................... 398/172

(58) Field of Classification Search
   CPC ...................................................... H04B 10/116
   USPC .......................................................... 398/172
   See application file for complete search history.

(56) References Cited

U.S. PATENT DOCUMENTS

| 2012/0294624 | A1* | 11/2012 | Noh et al. ..................... 398/142 |
| 2013/0028612 | A1* | 1/2013  | Ryan et al. ..................... 398/172 |
| 2013/0141555 | A1* | 6/2013  | Ganick et al. .................... 348/61 |
| 2013/0272717 | A1* | 10/2013 | Deguchi et al. ................ 398/154 |

* cited by examiner

*Primary Examiner* — Leslie Pascal
(74) *Attorney, Agent, or Firm* — Banner & Witcoff, Ltd.

(57) ABSTRACT

The present invention discloses methods and devices for transmitting/obtaining information by visible light signal. The method for transmitting information by visible light signal from a light source comprising: modulating, on the basis of the information to be transmitted, a driving signal of the light source to obtain a modulated driving signal for driving the light source to emit visible light signal having its level changed between a peak level and a bottom level with varied frequencies at different time points; and emitting the visible light signal having its level changed between a peak level and a bottom level with varied frequencies at different time points on the basis of the modulated driving signal, so as to transmit information corresponding to the varied numbers of bright or dark stripes shown in one or more images obtained from the visible light signal at one or more time points, which numbers are corresponding to the varied frequencies.

30 Claims, 22 Drawing Sheets

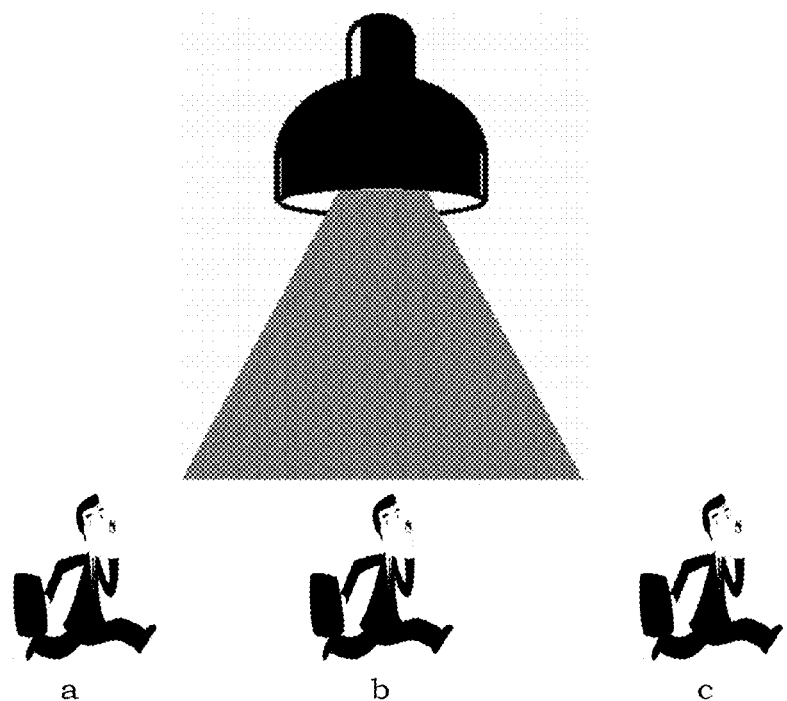

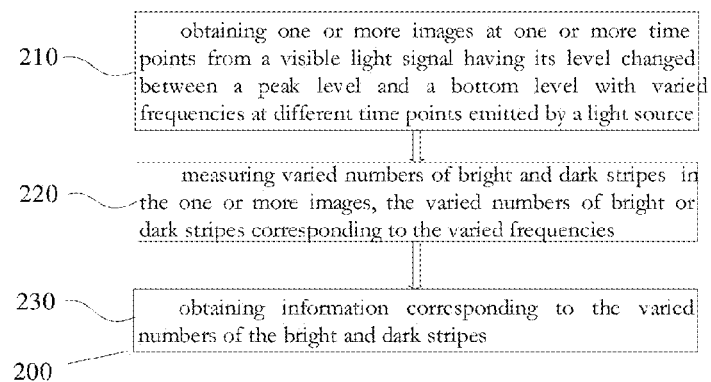

210 — obtaining one or more images at one or more time points from a visible light signal having its level changed between a peak level and a bottom level with varied frequencies at different time points emitted by a light source 220 — measuring varied numbers of bright and dark stripes in the one or more images, the varied numbers of bright or dark stripes corresponding to the varied frequencies 230 — obtaining information corresponding to the varied numbers of the bright and dark stripes

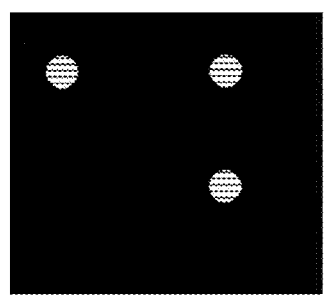

Figure 8

Searching Xmin    Searching Xmax    Searching Ymin    Searching Ymax

| measured gray scale value | | | | | gray scale dualization value | | | | | sum of gray scale dualizaton values | dualization value | transition between bright and dark stripes | number of stripes |
|---|---|---|---|---|---|---|---|---|---|---|---|---|---|
| 189 | 178 | 197 | 174 | 192 | 1 | 1 | 1 | 1 | 1 | 5 | 1 | | |
| 163 | 192 | 165 | 185 | 160 | 1 | 1 | 1 | 1 | 1 | 5 | 1 | | |
| 191 | 189 | 199 | 190 | 169 | 1 | 1 | 1 | 1 | 1 | 5 | 1 | | |
| 197 | 171 | 191 | 195 | 171 | 1 | 1 | 1 | 1 | 1 | 5 | 1 | | |
| 161 | 164 | 166 | 166 | 189 | 1 | 1 | 1 | 1 | 1 | 5 | 1 | ← | +1 |
| 17 | 8 | 22 | 28 | 3 | 0 | 0 | 0 | 0 | 0 | 0 | 0 | | |
| 15 | 19 | 36 | 0 | 5 | 0 | 0 | 0 | 0 | 0 | 0 | 0 | ← | +1 |
| 160 | 165 | 188 | 180 | 161 | 1 | 1 | 1 | 1 | 1 | 5 | 1 | | |
| 182 | 186 | 165 | 172 | 167 | 1 | 1 | 1 | 1 | 1 | 5 | 1 | | |
| 160 | 165 | 188 | 190 | 193 | 1 | 1 | 1 | 1 | 1 | 5 | 1 | | |
| 175 | 160 | 164 | 184 | 181 | 1 | 1 | 1 | 1 | 1 | 5 | 1 | | |
| 169 | 174 | 163 | 160 | 177 | 1 | 1 | 1 | 1 | 1 | 5 | 1 | ← | +1 |
| 15 | 39 | 1 | 16 | 28 | 0 | 0 | 0 | 0 | 0 | 0 | 0 | | |
| 15 | 5 | 19 | 17 | 34 | 0 | 0 | 0 | 0 | 0 | 0 | 0 | ← | +1 |
| 174 | 190 | 161 | 189 | 195 | 1 | 1 | 1 | 1 | 1 | 5 | 1 | | |
| 164 | 179 | 163 | 163 | 184 | 1 | 1 | 1 | 1 | 1 | 5 | 1 | | |
| 170 | 173 | 182 | 168 | 170 | 1 | 1 | 1 | 1 | 1 | 5 | 1 | | |
| 194 | 197 | 189 | 187 | 169 | 1 | 1 | 1 | 1 | 1 | 5 | 1 | | |
| 174 | 176 | 174 | 194 | 167 | 1 | 1 | 1 | 1 | 1 | 5 | 1 | ← | +1 |
| 35 | 21 | 32 | 1 | 30 | 0 | 0 | 0 | 0 | 0 | 0 | 0 | | |
| 38 | 32 | 27 | 35 | 28 | 0 | 0 | 0 | 0 | 0 | 0 | 0 | ← | +1 |
| 197 | 166 | 166 | 197 | 162 | 1 | 1 | 1 | 1 | 1 | 5 | 1 | | |
| 164 | 168 | 191 | 188 | 187 | 1 | 1 | 1 | 1 | 1 | 5 | 1 | | |
| 192 | 189 | 177 | 181 | 173 | 1 | 1 | 1 | 1 | 1 | 5 | 1 | | |
| 166 | 165 | 182 | 164 | 174 | 1 | 1 | 1 | 1 | 1 | 5 | 1 | | |
| 164 | 167 | 171 | 174 | 190 | 1 | 1 | 1 | 1 | 1 | 5 | 1 | ← | +1 |
| 36 | 35 | 37 | 8 | 21 | 0 | 0 | 0 | 0 | 0 | 0 | 0 | | |
| 3 | 33 | 23 | 0 | 26 | 0 | 0 | 0 | 0 | 0 | 0 | 0 | ← | +1 |
| 182 | 188 | 198 | 199 | 192 | 1 | 1 | 1 | 1 | 1 | 5 | 1 | | |
| 177 | 182 | 180 | 179 | 174 | 1 | 1 | 1 | 1 | 1 | 5 | 1 | | |
| 164 | 168 | 177 | 190 | 183 | 1 | 1 | 1 | 1 | 1 | 5 | 1 | | |
| 180 | 187 | 167 | 198 | 165 | 1 | 1 | 1 | 1 | 1 | 5 | 1 | | |
| 169 | 194 | 184 | 197 | 197 | 1 | 1 | 1 | 1 | 1 | 5 | 1 | ← | +1 |
| 2 | 9 | 21 | 20 | 30 | 0 | 0 | 0 | 0 | 0 | 0 | 0 | | |
| 32 | 23 | 15 | 14 | 7 | 0 | 0 | 0 | 0 | 0 | 0 | 0 | ← | +1 |
| 161 | 192 | 169 | 186 | 170 | 1 | 1 | 1 | 1 | 1 | 5 | 1 | | |
| 169 | 189 | 176 | 194 | 193 | 1 | 1 | 1 | 1 | 1 | 5 | 1 | | |
| 164 | 197 | 185 | 172 | 180 | 1 | 1 | 1 | 1 | 1 | 5 | 1 | | |
| 185 | 192 | 197 | 182 | 183 | 1 | 1 | 1 | 1 | 1 | 5 | 1 | | |
| 160 | 173 | 196 | 183 | 193 | 1 | 1 | 1 | 1 | 1 | 5 | 1 | | |

METHODS AND DEVICES FOR TRANSMITTING/OBTAINING INFORMATION BY VISIBLE LIGHT SIGNAL

TECHNICAL FIELD

The present invention generally relates to the field of visible light communication, and particularly relates to methods and devices for transmitting/obtaining information by visible light signal.

BACKGROUND

Visible light communication is a communication technology which uses the variation of visible light (color, intensity, or position) to transmit information. Such communication technology for transmitting information is based on high-frequency blinking visible lights. In details, information to be transmitted is firstly compiled into a digital signal; this digital signal is then applied to modulate the duration time or frequencies of the driving current or driving voltage of the light source, so that the light source blinks in high frequencies.

This high-frequency blinking signal can be detected by a photosensitive device, for example, an image sensor. The image sensor may be based on the "rolling shutter" mechanism, which means that different parts of the sensor, each row or each column, are exposed at different time. Based on this feature, when taking pictures of a light source with rapidly changing brightness, the image sensor with a rolling shutter can deliver an image which contains bright or dark stripes. By measuring the width of the stripes, the frequencies of the driving current or driving voltage of the light source may be calculated and the transmitted information may thus be restored.

However, this method has following drawbacks: the width of the stripes can be affected by local over-exposure of the image sensor, for instance, the bright stripes may become broader and the dark stripes may become narrower or even disappear within the over-exposed area, causing failure of the image analysis and decoding; and different background lighting conditions may induce uncertainties for measuring the width of stripes.

Additionally, the photosensitive devices used in such visible light communication technology require to be specially designed to detect the visible light signal, and thus, only can be applied in limited scenarios. Additionally, although the commercially available mobile devices (such as, smartphones, tablets, PDAs) have photosensitive components, for example, the image sensor, they are not suitable for sensing such high-frequency blinking signal.

SUMMARY

Objects of the present invention are to provide technical solutions for transmitting information by visible light signals or obtaining information from visible light signals, which obviate at least one of the above-mentioned disadvantages.

According to a first aspect of the present invention, there is provided a method for transmitting information by visible light signal from a light source, the method comprising: modulating, on the basis of the information to be transmitted, a driving signal of the light source to obtain a modulated driving signal for driving the light source to emit visible light signal having its level changed between a peak level and a bottom level with varied frequencies at different time points; and emitting the visible light signal having its level changed between a peak level and a bottom level with varied frequencies at different time points on the basis of the modulated driving signal, so as to transmit information corresponding to the varied numbers of bright or dark stripes shown in one or more images obtained from the visible light signal at one or more time points, which numbers are corresponding to the varied frequencies.

According to some embodiments of the present invention, modulating on the basis of the information to be transmitted a driving signal of the light source to obtain a modulated driving signal comprises: modulating on the basis of the information to be transmitted a driving voltage or a driving current of the light source to obtain a first modulated driving voltage or a first modulated driving current.

According to some embodiments of the present invention, the first modulated driving current is greater than the un-modulated driving current, so that luminous flux of the light source driven by the first modulated driving current is equal to luminous flux of the light source driven by the un-modulated driving current.

According to some embodiments of the present invention, emitting the visible light signal on the basis of a second modulated driving current which is greater than the un-modulated driving current together with a high frequency carrier wave signal, so that luminous flux of the light source driven by the second modulated driving current is constant among periods comprising peak levels and bottom levels.

According to some embodiments of the present invention, the first modulated driving voltage or the first modulated driving current is used for driving the light source to emit a visible light signal with a frequency from 100 Hz to 1.37 MHz, and duration of each bottom level of the visible light signal is fixed, or duration of each peak level of the visible light signal is fixed.

According to some embodiments of the present invention, the method further comprising: detecting the presence of a human being within an illumination scope of the light source; and emitting a visible light signal on the basis of un-modulated driving signal in the absence of a human being.

According to some embodiments of the present invention, the information corresponding to the varied numbers of bright or dark stripes comprises data bits which comprise data corresponding to the varied frequencies, and each data bit corresponds to a number among the varied numbers of bright or dark stripes.

According to some embodiments of the present invention, the information corresponding to the varied numbers of bright or dark stripes further comprises one or more starts bit and/or one or more error correction bits, the one or more start bits being used to identify a start position of a set of data bits, and the one or more error correction bits being used to check error in the data bits.

According to a second aspect of the present invention, there is provided a method for obtaining information from visible light, the method comprising: obtaining one or more images at one or more time points from a visible light signal having its level changed between a peak level and a bottom level with varied frequencies at different time points emitted by a light source; measuring varied numbers of bright or dark stripes in the one or more images, the varied numbers of bright or dark stripes being corresponding to the varied frequencies; and obtaining information corresponding to the varied numbers of the bright or dark stripes.

According to some embodiments of the present invention, obtaining one or more images comprises obtaining the one or more images by an image capturing device comprising an image sensor whose exposure mode is rolling shutter mode, and a sampling rate of the rolling shutter is higher than the frame rate of the image sensor.

According to some embodiments of the present invention, obtaining one or more images comprises capturing on an image sensor with a rolling shutter the one or more images in which different portions of the image sensor are exposed at different time points.

According to some embodiments of the present invention, the visible light signal is emitted by the light source on the basis of a modulated driving signal, which drives the light source to emit the visible light signal having its level changed between a peak level and a bottom level with varied frequencies at different time points.

According to some embodiments of the present invention, the light source is one or more light sources, and obtaining one or more images at one or more time points from visible light signal having its level changed between a peak level and a bottom level with varied frequencies at different time points emitted by a light source comprises: obtaining one or more images at one or more time points from visible light signal having its level changed between a peak level and a bottom level with varied frequencies at different time points emitted by the one or more light sources, wherein one or more exposed regions in each image correspond to the one or more light sources, measuring varied numbers of bright or dark stripes in the one or more images comprises: measuring the varied numbers of the bright or dark stripes of the one or more exposed regions in each image, and obtaining information corresponding to the varied numbers of the bright or dark stripes comprises: obtaining information corresponding to the varied numbers of the bright or dark stripes of the one or more exposed regions in each image.

According to some embodiments of the present invention, the information corresponding to the varied numbers of bright or dark stripes comprises data bits which comprise data corresponding to the varied frequencies, and each data bit corresponds to a number among the varied numbers of bright or dark stripes.

According to some embodiments of the present invention, the information corresponding to the varied numbers of bright or dark stripes further comprises one or more start bits and/or one or more error correction bits, the one or more start bits being used to identify a start position of a set of data bits, and the one or more error correction bits being used to check error in the data bits.

According to a third aspect of the present invention, there is provided a light source for transmitting information by visible light signal, comprising: a modulator configured to modulate, on the basis of the information to be transmitted, a driving signal of the light source to obtain a modulated driving signal for driving the light source to emit visible light signal having its level changed between a peak level and a bottom level with varied frequencies at different time points; and an emitter configured to emit the visible light signal having its level changed between a peak level and a bottom level with varied frequencies at different time points on the basis of the modulated driving signal, so as to transmit information corresponding to the varied numbers of bright or dark stripes shown in one or more images obtained from the visible light signal at one or more time points, which numbers are corresponding to the varied frequencies.

According to some embodiments of the present invention, the modulator is configured to modulate on the basis of the information to be transmitted a driving voltage or a driving current of the light source to obtain a first modulated driving voltage or a first modulated driving current.

According to some embodiments of the present invention, the first modulated driving current is greater than the un-modulated driving current, so that luminous flux of the light source driven by the first modulated driving current is equal to luminous flux of the light source driven by the un-modulated driving current.

According to some embodiments of the present invention, the emitter is configured to emit the visible light signal on the basis of a second modulated driving current which is greater than the un-modulated driving current together with a high frequency carrier wave signal, so that luminous flux of the light source driven by the second modulated driving current is constant among periods comprising peak levels and bottom levels.

According to some embodiments of the present invention, the first modulated driving voltage or the first modulated driving current is used for driving the light source to emit a visible light signal with a frequency from 100 Hz to 1.37 MHz, and duration of each bottom level of the visible light signal is fixed, or duration of each peak level of the visible light signal is fixed.

According to some embodiments of the present invention, the light source further comprising: a detector configured to detect the presence of a human being within a illumination scope of the light source; and wherein the emitter is configured to emit a visible light signal on the basis of un-modulated driving signal in the absence of a human being.

According to some embodiments of the present invention, the information corresponding to the varied numbers of bright or dark stripes comprises data bits which comprise data corresponding to the varied frequencies, and each data bit corresponds to a number among the varied numbers of bright or dark stripes.

According to some embodiments of the present invention, the information corresponding to the varied numbers of bright or dark stripes further comprises one or more starts bit and/or one or more error correction bits, the start bits being used to identify a start position of a set of data bits, and the one or more error correction bits being used to check error in the data bits.

According to a fourth aspect of the present invention, there is provided a device for obtaining information from visible light, comprising: an image sensor configured to obtain one or more images at one or more time points from a visible light signal having its level changed between a peak level and a bottom level with varied frequencies at different time points emitted by a light source; a memory configured to store the one or more images obtained by the image sensor at one or more time points; and a processor configured to measure varied numbers of bright or dark stripes in the one or more images stored in the memory and obtain information corresponding to the varied numbers of the bright or dark stripes, the varied numbers of bright or dark stripes being corresponding to the varied frequencies.

According to some embodiments of the present invention, exposure mode of the image sensor is rolling shutter mode, and a sampling rate of the rolling shutter is higher than the frame rate of the image sensor.

According to some embodiments of the present invention, the image sensor is an image sensor with a rolling shutter and is configured to obtain the one or more images in which different portions of the image sensor are exposed at different time points.

According to some embodiments of the present invention, the visible light signal is emitted by the light source on the basis of a modulated driving signal, which drives the light source to emit the visible light signal having its level changed between a peak level and a bottom level with varied frequencies at different time points.

According to some embodiments of the present invention, the light source is one or more light sources, and the image sensor is configured to obtain one or more images at one or more time points from visible light signal having its level changed between a peak level and a bottom level with varied frequencies at different time points emitted by the one or more light sources, wherein one or more exposed regions in each image correspond to the one or more light sources, the memory is configured to store the one or more images obtained by the image sensor at one or more time points; and the processor is configured to measure the varied numbers of the bright or dark stripes of the one or more exposed regions in each image, and obtain information corresponding to the varied numbers of the bright or dark stripes of the one or more exposed regions in each image.

According to some embodiments of the present invention, the information corresponding to the varied numbers of bright or dark stripes comprises data bits which comprise data corresponding to the varied frequencies, and each data bit corresponds to a number among the varied numbers of bright or dark stripes.

According to some embodiments of the present invention, the information corresponding to the varied numbers of bright or dark stripes further comprises one or more start bits and/or one or more error correction bits, the one or more start bits being used to identify a start position of a set of data bits, and the one or more error correction bits being used to check error in the data bits.

In conclusion, the embodiments of the present invention provide an efficient and effective approach for transmitting and obtaining information, which can transmit and obtain information much faster and more accurate, and the information transmitted and obtained may contain more data bits. The present invention has advantages of high confidentiality, no occupancy of wireless channel resources, low cost, and easy integration with various light sources. Further, the present invention effectively avoids the undesirable blinking of the light source detectable by human eyes.

BRIEF DESCRIPTION OF THE DRAWINGS

The accompanying drawings are included to provide a further understanding of embodiments and constitute a part of this description. The drawings illustrate embodiments and together with the description serve to explain principles of embodiments. The elements of the drawings are not necessarily to scale relative to each other. Similar reference numerals designate corresponding similar parts. It should be expressly understood that the drawings are included for illustrative purposes and do not in any manner limit the scope of the present invention.

FIG. 6 shows a light source emitting visible light signal for transmitting information in response to the presence of a human being according to an embodiment of the present invention;

FIG. 7 is a flow chart illustrating a method for obtaining information from visible light signal according to an embodiment of the present invention;

FIG. 8 is a schematic diagram of an image containing one or more exposed regions corresponding to one or more light sources according to an embodiment of the present invention;

DETAILED DESCRIPTION

In the following description, for purposes of explanation rather than limitation, specific details, such as the particular architecture, structure, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It is to be understood that the features of the various exemplary embodiments described herein may be combined with each other, unless specifically noted otherwise.

Figure 1:
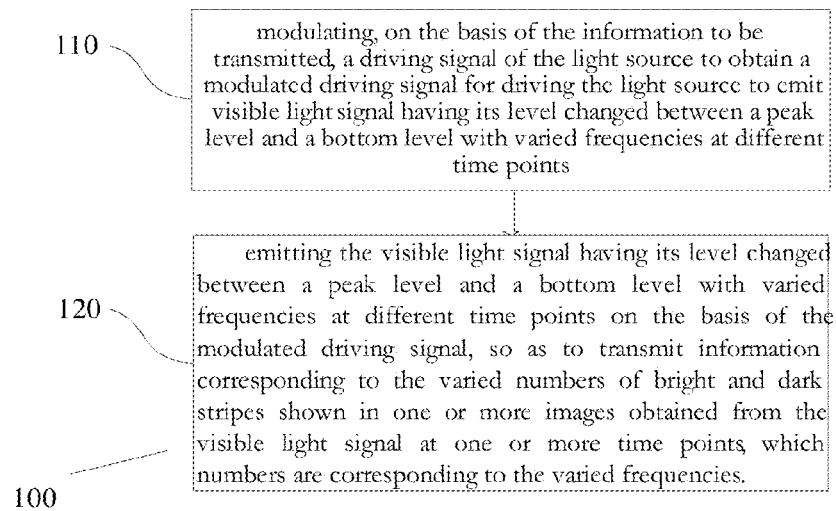
FIG. 1 is a flow chart illustrating a method 100 for transmitting information by visible light signal from a light source according to an embodiment of the present invention.

According to a first aspect of the present invention, there is provided a method for transmitting information by visible light signal from a light source. FIG. 1 is a flow chart illustrating the method 100 for transmitting information by visible light signal from a light source according to an embodiment of the present invention.

As shown in FIG. 1, the method 100 begins with a step 110 of modulating, on the basis of the information to be transmitted, a driving signal of the light source to obtain a modulated driving signal for driving the light source to emit visible light signal having its level changed between a peak level and a bottom level with varied frequencies at different time points.

According to embodiments of the present invention, the light source may be any type of light source emitting visible light signal, for example, LED, fluorescent, or incandescent lamp.

According to embodiments of the present invention, the information transmitted by visible light signal may be any type of information, for example, data such as text, picture, audio, video data, the identifier (ID) of the light source, and other information.

According to embodiments of the present invention, the driving signal of the light source may be in the forms of square wave, sine wave, triangle wave, wave on a higher-frequency carrier, the aforesaid waves containing DC component, or in other forms of wave.

According to embodiments of the present invention, the driving signal of the light source may be modulated by the Pulse Width Modulation (PWM). Generally, the pulse duration is fixed, and the duty of the signal can be modulated, wherein the duty in a pulse cycle (such as square wave) is the ratio of the positive pulse duration (i.e., duration of the positive part) to the total duration.

According to embodiments of the present invention, the step 110 may comprise: modulating on the basis of the information to be transmitted a driving voltage or a driving current of the light source to obtain a first modulated driving voltage or a first modulated driving current. And the first modulated driving voltage or the first modulated driving current may be used to drive the light source to emit the visible light signal having its level changed between a peak level and a bottom level with varied frequencies at different time points.

Figure 2A:
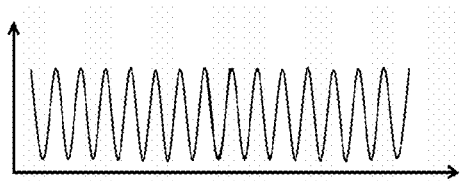
FIGS. 2a-2c are the schematic diagrams of the driving signals for driving the light source according to embodiments of the present invention.
Figure 2B:
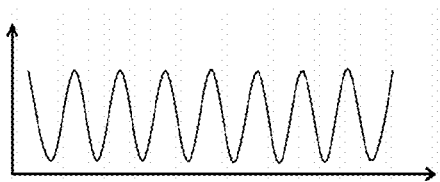
Figure 2C:
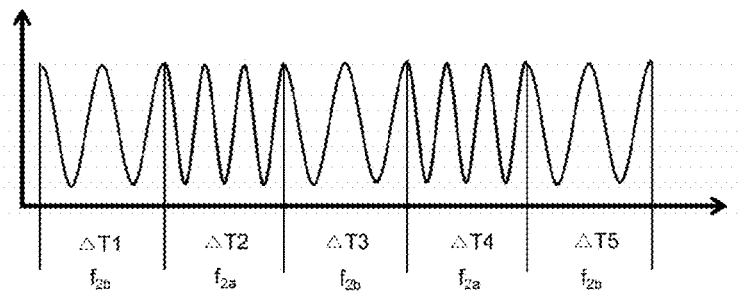

FIGS. 2a-2c are the schematic diagrams of the driving signals for driving the light source according to embodiments of the present invention. In FIG. 2a, the driving signal, optionally the driving current, of a light source is in the form of sine wave with a frequency of $f_{2a}$. In FIG. 2b, the driving signal, optionally the driving current, of the light source is in the form of sine wave with a frequency of $f_{2b}$, and $f_{2a} > f_{2b}$.

According to an embodiment of the present invention, the driving signal, optionally the driving current, of the light source may be modulated on the basis of the information to be transmitted to obtain a first modulated driving current, as shown in FIG. 2c, which has a frequency of $f_{2b}$ at time points within a time interval ΔT1, a frequency of $f_{2a}$ at time points within a time interval 2 ΔT2, a frequency of $f_{2b}$ at time points within a time interval 3 ΔT3, a frequency of $f_{2a}$ at time points within a time interval 4 ΔT4, and a frequency of $f_{2b}$ at time points within a time interval 5 ΔT5. The first modulated driving current may be used to drive the light source to emit the visible light signal having its level changed between a peak level and a bottom level with varied frequencies at different time points, for example, with varied frequencies $f_{2a}$ and $f_{2b}$ at different time points within ΔT1, ΔT2, ΔT3, ΔT4 and ΔT5. Alternatively, the driving voltage of the light source may also be modulated on the basis of the information to be transmitted. Alternatively, the driving current or the driving voltage of the light source may have other wave forms. Alternatively, the driving current or the driving voltage of the light source may be modulated to emit visible light signal with three or more kinds of varied frequencies at different time points.

As shown in FIG. 1, after the step 110 described hereinbefore, a step 120 of the method 100 is performed, that is, emitting the visible light signal having its level changed between a peak level and a bottom level with varied frequencies at different time points on the basis of the modulated driving signal, so as to transmit information corresponding to the varied numbers of bright or dark stripes shown in one or more images obtained from the visible light signal at one or more time points, which numbers are corresponding to the varied frequencies.

Optionally, the dark stripe corresponds to the bottom level of the visible light signal, and the bright stripe corresponds to the peak level of the visible light signal. The varied number of the bright stripes and dark stripes corresponds to different information transmitted.

Figure 3A:
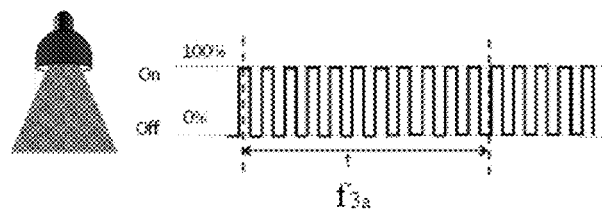
FIGS. 3a, 3c and 3e are the schematic diagrams of the driving signals for driving the light source according to embodiments of the present invention.
Figure 3B:
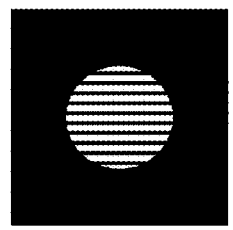
FIGS. 3b, 3d and 3f are the images obtained from the driving signals of FIGS. 3a, 3c and 3e respectively according to embodiments of the present invention.
Figure 3C:
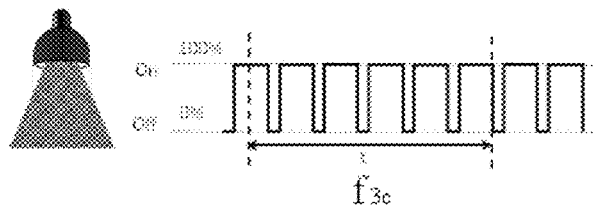
Figure 3D:
Figure 3E:
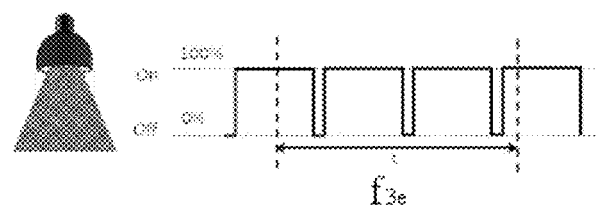
Figure 3F:
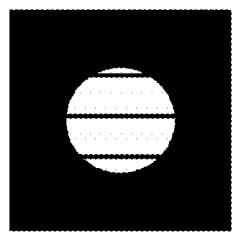

FIGS. 3a, 3c and 3e are the schematic diagrams of the driving signals for driving the light source, and FIGS. 3b, 3d and 3f are the images obtained respectively according to embodiments of the present invention.

In FIG. 3a, the driving signal, optionally the driving current, of a light source is in the form of square wave with a frequency of $f_{3a}$ and the starting time for capturing an image is at the time point when one of the peal levels of the visible light signal is emitted. Optionally, from the driving signal shown in FIG. 3a, an image with 10 dark stripes and 11 bright stripes as shown in FIG. 3b may be obtained, where the number of the bright or dark stripes is corresponding to the frequency $f_{3a}$. Alternatively, where the starting time for capturing an image is at the time point when one of the bottom levels of the visible light signal is emitted, an image having 11 dark stripes and 10 bright stripes may be obtained (not shown).

In FIG. 3c, the driving signal, optionally the driving current, of a light source is in the form of square wave with a frequency of $f_{3c}$ with $f_{3a} > f_{3c}$ and the starting time for capturing an image is at the time point when one of the peal levels of the visible light signal is emitted. Optionally, from the driving signal shown in FIG. 3c, an image with 5 dark stripes and 6 bright stripes as shown in FIG. 3d may be obtained, where the number of the bright or dark stripes is corresponding to the frequency $f_{3c}$. Alternatively, where the starting time for capturing an image is at the time point when one of the bottom levels of the visible light signal is emitted, an image having 6 dark stripes and 5 bright stripes may be obtained (not shown).

In FIG. 3e, the driving signal, optionally the driving current, of a light source is in the form of square wave with a frequency of $f_{3e}$ with $f_{3c} > f_{3e}$, and the starting time for capturing an image is at the time point when one of the peal levels of the visible light signal is emitted. Optionally, from the driving signal shown in FIG. 3c, an image with 3 dark stripes and 4 bright stripes as shown in FIG. 3f may be obtained, where the number of the bright or dark stripes is corresponding to the frequency $f_{3e}$. Alternatively, where the starting time for capturing an image is at the time point when one of the bottom levels of the visible light signal is emitted, an image having 4 dark stripes and 3 bright stripes may be obtained (not shown).

Figure 3G:
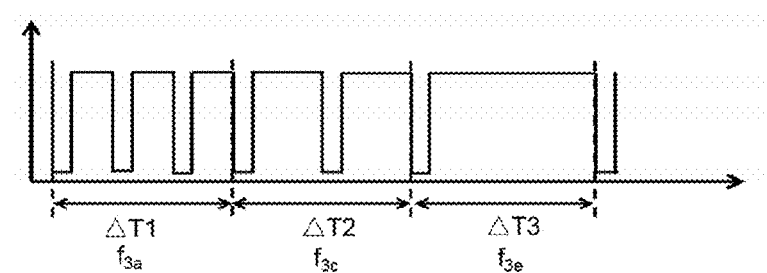
FIG. 3g shows visible light signal with varied frequencies at different time points emitted by a light source driven by a first modulated driving current according to another embodiment of the present invention.

FIG. 3g shows a visible light signal with varied frequencies at different time points emitted by a light source driven by a first modulated driving current. The first modulated driving current may be used to drive the light source to emit the visible light signal having its level changed between a peak level and a bottom level with varied frequencies at different time points, for example, with varied frequencies $f_{3a}$, $f_{3c}$ and $f_{3e}$ at different time points within time intervals ΔT1, ΔT2 and ΔT3. Optionally, within each time interval with a different frequency, a code is transmitted, for example, within ΔT1 a code "1" is transmitted, within ΔT2 a code "2" is transmitted, and within ΔT3 a code "3" is transmitted.

After emitting the visible light signal on the basis of the first modulated driving current, as shown in FIG. 3g, an image with 10 dark stripes and 11 bright stripes as shown in FIG. 3b, corresponding to $f_{3a}$, may be obtained at different time points within ΔT1; an image with 5 dark stripes and 6 bright stripes as shown in FIG. 3d, corresponding to $f_{3c}$, may be obtained at different time points within ΔT2; and an image with 3 dark stripes and 4 bright stripes as shown in FIG. 3f, corresponding to $f_{3e}$, may be obtained at different time points within ΔT3. The information corresponding to the varied numbers of bright or dark stripes shown in the images in FIG. 3b, 3d, 3f obtained from the visible light signal in FIG. 3g is transmitted, and the numbers of bright or dark stripes are corresponding to frequencies $f_{3a}$, $f_{3c}$, $f_{3e}$. Alternatively, the driving voltage of the light source may also be modulated on the basis of the information to be transmitted.

Alternatively, the driving current or the driving voltage of the light source may have other wave forms. Alternatively, the driving current or the driving voltage of the light source may be modulated to emit visible light signal with four or more kinds of varied frequencies at different time points.

According to an embodiment of the present invention, the first modulated driving current is greater than the un-modulated driving current, so that luminous flux of the light source driven by the first modulated driving current is equal to luminous flux of the light source driven by the un-modulated driving current.

The luminous flux is the measure of the power of light emitted by the light source during unit time, and is proportional to the area below the wave of the driving signal, the variation of which is sensitive to human eye. The driving signal may be modulated with the first modulated driving currents greater than un-modulated driving currents, so that luminous flux of the light source is constant throughout the transmission of information to avoid blinking.

Figure 4A:
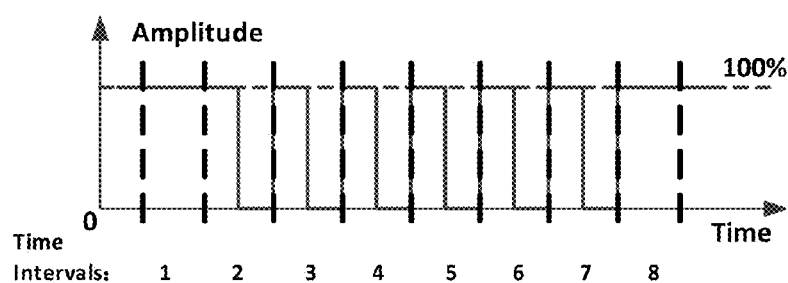
FIG. 4a is the schematic diagram of a modulated driving current of a light source equal to the un-modulated driving current according to an embodiment of the present invention.

FIG. 4a is the schematic diagram of a modulated driving current of a light source equal to the un-modulated driving current according to an embodiment of the present invention. It can be assumed that the luminous flux of the light source driven by the un-modulated driving currents is 100%. Assuming that the width of the peak levels and bottom levels of the modulated driving current may be 0.1 ms respectively and the modulated driving current is equal to the un-modulated driving current, the luminous flux of the light source driven by the modulated driving current shown in FIG. 4a can be calculated to be (0.1*0+0.1*1)*100%/(0.1+0.1)=50%. The luminous flux 50% of the light source driven by the modulated driving current is lower than that of the light source driven by the un-modulated driving current (100%), causing undesirable blinking of the light source detectable by human eye.

Figure 4B:
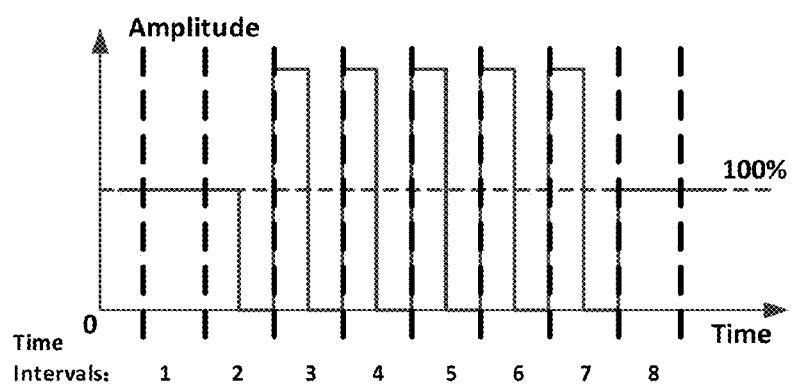
FIG. 4b is the schematic diagram of a modulated driving current greater than the un-modulated driving current according to an embodiment of the present invention.

FIG. 4b is the schematic diagram of a modulated driving current greater than the un-modulated driving current according to an embodiment of the present invention. Still, assuming that the width of the peak levels and bottom levels of the modulated driving current is 0.1 ms, respectively, and the modulated driving current is twice of the un-modulated driving current, the luminous flux of the light source driven by the modulated driving current shown in FIG. 4b can be calculated to be (0.1*0+0.1*2)*100%/(0.1+0.1)=100%. The luminous flux 100% of the light source driven by the modulated driving current is equal to the luminous flux 100% of light source driven by the un-modulated driving current, avoiding undesirable blinking of the light source detectable by human eye. It should be noted that, the values provide in the embodiments of the present invention are theoretical values for illustrative purposes, but not actual values. The actual values may vary due to the parameters of different devices.

Alternatively, as for a first modulated driving current for driving the light source to emit the visible light signal with varied frequencies at different time points, for example, with varied frequencies $f_{3a}$, $f_{3c}$ and $f_{3e}$ at different time points within time intervals $\Delta T1$, $\Delta T2$ and $\Delta T3$ as shown in FIG. 3g, the driving signal may be modulated, in the similar manner as shown in FIGS. 4a and 4b, so that luminous flux of the light source driven by the first modulated driving current in $\Delta T1$, $\Delta T2$, $\Delta T3$ is equal to luminous flux of the light source driving by the un-modulated driving current.

According to embodiments of the present invention, optionally, the method 100 may comprise a step of emitting the visible light signal on the basis of a second modulated driving current which is greater than the un-modulated driving current together with a high frequency carrier wave signal, so that luminous flux of the light source driven by the second modulated driving current is constant among periods comprising peak levels and bottom levels.

Figure 4C:
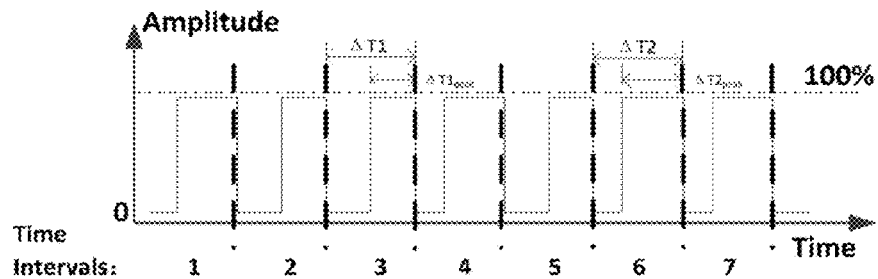
FIG. 4c is the schematic diagram of a modulated driving current greater than the un-modulated driving current without high frequency carrier wave signal according to an embodiment of the present invention.

FIG. 4c is the schematic diagram of a modulated driving current greater than the un-modulated driving current without high frequency carrier wave signal according to an embodiment of the present invention. As shown in FIG. 4c, within different time intervals $\Delta T1$ and $\Delta T2$, the peak levels and bottom levels may have different durations of peak levels and bottom levels for transmitting different codes, as shown in FIG. 4c, resulting in different luminous fluxes of the light source driven by the modulated driving current, causing the light source to blink. For example, as shown in FIG. 4c, within a time interval $\Delta T1$ representing code "1", the driving current is modulated to have a total duration of peak level of $$\Delta T1_{peak} = \frac{1}{2} * \Delta T1,$$

giving a luminous flux of 50%; and within another time interval $\Delta T2$ representing code "2", the driving current is modulated to have a total duration of peak level of $$\Delta T2_{peak} = \frac{2}{3} * \Delta T2,$$

giving a luminous flux of 66.7%. Therefore, the luminous flux within $\Delta T1$ representing code "1" is less than that within $\Delta T2$ representing code "2", causing the light source to blink.

In order to avoid the blinking of the light source when transmitting different codes, the driving current which is greater than un-modulated driving current is further modulated with a high frequency carrier wave signal. By modulating with a high frequency carrier wave signal, within different time intervals, the durations of peak levels and bottom levels of the driving current for transmitting different codes are same, giving the same luminous flux among periods comprising the peak levels and bottom levels, and thus avoiding the blinking of the light source. For example, as shown in FIG. 4d, within time interval $\Delta T1$ representing code "1", the driving current is further modulated with a high frequency carrier wave to have a total duration of peak levels of $$\Delta T1_{peak} = \frac{1}{2} * \Delta T1 * 66.7\%,$$

giving a luminous flux of 33.3%; within time interval $\Delta T2$ representing code "2", the driving current is further modulated with a high frequency carrier wave to have a total duration of peak levels of $$\Delta T2_{peak} = \frac{2}{3} * \Delta T2 * 50\%,$$

giving a luminous flux of 33.3%. Therefore, the luminous flux within $\Delta T1$ representing code "1" is equal to that within $\Delta T2$ representing code "2", avoiding undesirable blinking of the light source detectable by human eye.

Figure 4D:
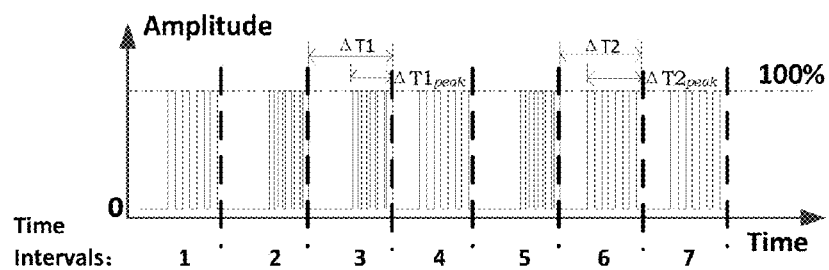
FIG. 4d is the schematic diagram of a modulated driving current greater than the un-modulated driving current together with a high frequency carrier wave signal according to an embodiment of the present invention.

For the purpose of illustration, the visible light signals shown in FIG. 4c and FIG. 4d have the same frequency within different intervals $\Delta T1$ and $\Delta T2$. It should be noted by those skilled in the art that a modulated driving current for driving the light source to emit the visible light signal with varied frequencies at different time points may be modulated in the similar manner as shown in FIGS. 4c and 4d, so that the luminous flux of the light source driven by the modulated driving current is equal to the luminous flux of the light source driving by the un-modulated driving current.

According to embodiments of the present invention, the information corresponding to the varied numbers of bright or dark stripes comprises data bits comprise data corresponding to the varied frequencies, and each data bit corresponds to a number among the varied numbers of bright or dark stripes.

With the first modulated driving current as shown in FIG. 3g, the images as shown in FIGS. 3b, 3d and 3f may be obtained at different time points within time intervals ΔT1, ΔT2 and ΔT3. The information corresponding to the varied numbers of bright or dark stripes in the images as shown in FIGS. 3b, 3d and 3f may be transmitted. The information transmitted may comprise data bits which comprise data corresponding to the varied frequencies, such as $f_{3a}$, $f_{3c}$ and $f_{3e}$ at different time points within time intervals ΔT1, ΔT2 and ΔT3. Each data bit corresponds to a number among the varied numbers of bright or dark stripes. For example, 10 dark stripes and 11 bright stripes as shown in FIG. 3b may represent code "1", 5 dark stripes and 6 bright stripes as shown in FIG. 3d may represent code "2", and 3 dark stripes and 4 bright stripes as shown in FIG. 3f may represent code "3". Of course, the first modulated driving current may have other combinations of signals with different frequencies or different durations.

Figure 5A:
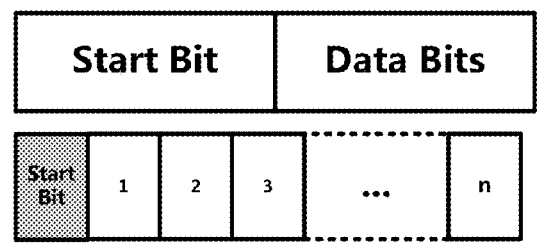
FIG. 5a is the schematic diagram of the information corresponding to the varied numbers of bright or dark stripes comprising a start bit according to an embodiment of the present invention.

According to an embodiment of the present invention, the information corresponding to the varied numbers of bright or dark stripes further comprises one or more starts bit and/or one or more error correction bits, the one or more start bits being used to identify a start position of a set of data bits, and the one or more error correction bits being used to check error in the data bits FIG. 5a is the schematic diagram of the information corresponding to the varied numbers of bright or dark stripes comprising a start bit according to an embodiment of the present invention. As shown in FIG. 5a, a start bit is added at the beginning of the data bits. Alternatively, more than one start bits may be included.

Figure 5B:
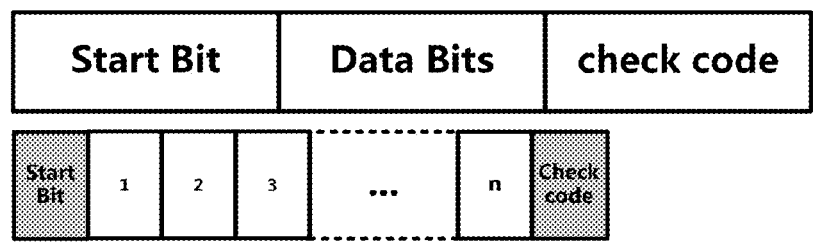
FIG. 5b is the schematic diagram of the information corresponding to the varied numbers of bright or dark stripes comprising a start bit and an error correction bit according to an embodiment of the present invention.

FIG. 5b is the schematic diagram of the information corresponding to the varied numbers of bright or dark stripes comprising a start bit and an error correction bit according to an embodiment of the present invention. As shown in FIG. 5b, besides a start bit, an error correction bit is also added at the end of the data bits. Alternatively, more than one error correction bits may be included. Alternatively, the one or more error correction bits may be added to the data bits without the start bit.

According to embodiments of the present invention, the first modulated driving voltage or the first modulated driving current is used for driving the light source to emit a visible light signal with a frequency from 100 Hz to 1.37 MHz, and duration of each bottom level of the visible light signal is fixed, or duration of each peak level of the visible light signal is fixed.

Optionally, the image may be obtained by an image capturing device comprising an image sensor whose exposure mode is the rolling shutter mode. The exposure time of the image sensor is defined as the exposure time of pixels in each row (or column) of the rolling shutter based image sensor.

When a frame rate of the image sensor is 30 Hz and a resolution is 640*480 (V-line*H-line), time required for capturing one image is 1 s/frame rate=1 s/30 Hz=0.033 s=33 ms, and time required for capturing each row 1 s/(frame rate*H-line)=33 ms/480=69 us≈70 us. In order to obtain a clear image containing bright or dark stripes with each stripe being corresponding to each row, the exposure time of each is less than 70 us, the duration of alternating the peak and bottom levels of the visible light signal emitted by the light source should be equal to or larger than 70 us and thus the frequency of the visible light signal is less than or equal to 1 s/(duration required for bright stripes+duration required for dark stripes)= 1 s/(1 s/(Frame rate*H-line)+1 s/(Frame rate*H-line))=1 s/(70 us+70 us)=7.14 kHz.

When a frame rate of the image sensor is 30 Hz, a resolution is 3 billion Hz with V-line:H-line=1:1, the frequency of the visible light signal is less than or equal to 1 s/(duration required for bright stripes+duration required for dark stripes)= 1 s/(1 s/(Frame rate*H-line)+1 s/(Frame rate*H-line))= $0.5*30$ Hz*$(3000000000)^{0.5}$=1.37 MHz. Since the light blinking frequency detectable by human eyes is less than 100 Hz, the frequency of visible light signal is from 100 Hz to 1.37 MHz.

Referring to FIG. 3g again, the first modulated driving current has the frequency of $f_{3a}$ at time points within the time interval ΔT1, the frequency of $f_{3c}$ at time points within the time interval ΔT2, and frequency of $f_{3e}$ at time points within the time interval ΔT3. Different time intervals ΔT1, ΔT2 and ΔT3 have same duration, and the numbers of the peak levels or bottom levels are different. For example, there are three peak levels or bottom levels within ΔT1; there are two peak levels or bottom levels within ΔT2; and there is one peak level or bottom level within ΔT3. As shown in FIG. 3g, the duration of each bottom level of the visible light signal is fixed. Therefore, after emitting the visible light signal on the basis of the first modulated driving current as shown in FIG. 3g, the images as shown in FIGS. 3b, 3d and 3f may be obtained at different time points within ΔT1, ΔT2 and ΔT3, and the dark stripes in the images as shown in FIGS. 3b, 3d and 3f have the same width. Alternatively, the duration of each peak level of the visible light signal may be fixed, and the bright stripes in the images have the same width.

According to embodiments of the present invention, optionally, the method 100 may further comprise steps of detecting the presence of a human being within an illumination scope of the light source, and emitting a visible light signal on the basis of un-modulated driving signal in the absence of a human being.

FIG. 6 shows a light source emitting visible light signal for transmitting information in response to the presence of a human being. As shown in FIG. 6, when no human being is presented within an illumination scope of the light source, such as at "position a" shown in FIG. 6, a visible light signal is emitted on the basis of un-modulated driving signal and no information is transmitted. When a human being is presented within the illumination scope of the light source, such as at "position b" shown in FIG. 6, the presence of the human being is detected, the driving signal of the light source is modulated on the basis of the information to be transmitted, the visible light signal is emitted on the basis of the modulated driving signal, and the information corresponding to the varied numbers of bright or dark stripes shown in one or more images obtained from the visible light signal is transmitted. When the human being leaves the illumination scope of the light source, such as at "position c" shown in FIG. 6, a visible light signal on the basis of un-modulated driving signal is emitted, and no information is transmitted.

It should be noted by those skilled in the art that the frequencies, waveforms, or widths of the peak levels and bottom levels of the modulated driving current are not limited to the above exemplary values, but may be set to have any values as required. Similarly, the frequencies, waveforms, or widths of the peak levels and bottom levels of the high frequency signal wave signal are not limited to the above exemplary values, but may be set to have any values as required.

According to a second aspect of the present invention, there is provided a method for obtaining information from visible light signal. FIG. 7 is a flow chart illustrating the method 200 for obtaining information from visible light signal according to an embodiment of the present invention.

As shown in FIG. 7, the method 200 begins with a step 210 of obtaining one or more images at one or more time points from a visible light signal having its level changed between a peak level and a bottom level with varied frequencies at different time points emitted by a light source.

According to embodiments of the present invention, the visible light signal may be emitted by the light source on the basis of a modulated driving signal, which drives the light source to emit visible light signal having its level changed between a peak level and a bottom level with varied frequencies at different time points, as described hereinbefore in details with respect to the method 100.

According to embodiments of the present invention, the modulated driving signal may be modulated by the PWM scheme. Optionally, the modulated driving signals may be modulated driving voltages or modulated driving currents.

Optionally, the modulated driving current may be greater than un-modulated driving current, so that luminous flux of the light source driven by the modulated driving current is equal to luminous flux of light source driven by the un-modulated driving current, as described hereinbefore in details with respect to the method 100 making reference to FIGS. 4a and 4b.

Optionally, the modulated driving current may be greater than un-modulated driving currents together with a high frequency carrier wave signal, so that the luminous flux of the light source driven by the driving current is constant among periods comprising peak levels and bottom levels, as described hereinbefore in details with respect to the method 100 making reference to FIGS. 4c and 4d.

The above embodiments have been described in details previously with respect to the method 100, and will not be iterated herein for the sake of conciseness.

According to embodiments of the present invention, the image obtained from the visible light signal may be an image containing bright or dark stripes as shown in FIGS. 3b, 3d, 3f, where varied numbers of bright or dark stripes correspond to the varied frequencies of the visible light signal.

According to embodiments of the present invention, the step 210 may comprise obtaining the one or more images by an image capturing device comprising an image sensor whose exposure mode is rolling shutter mode, and a sampling rate of the rolling shutter is higher than the frame rate of the image sensor. The image capturing device is used for capturing the one or more images obtained from the visible light signal emitted by the light source. The image capturing device may be a smartphone, laptop computer, or other electronic device equipped with camera(s). Alternatively, the image capturing device may be an embedded system integrated in other devices or objects, for example, piece jewelry, key, card, pen, etc. The image sensor may be a photosensitive component.

For an image sensor whose exposure mode is rolling shutter mode, different parts of the image sensor, each row or each column, may be exposed at different time. The image sensor may obtain one or more images containing bright or dark stripes, such as those shown in FIG. 3b, 3d or 3f, when capturing one or more images at different time points of a rapidly changing light source driven by the modulated driving signal, such as those shown in FIG. 3g. Optionally, the sampling rate of the rolling shutter is higher than the frame rate of the image sensor, so as to obtain a clear image containing bright or dark stripes with each stripe being corresponding to each row. For example, for a frame rate of the image sensor of 30 Hz and a resolution of 640*480, time required for capturing one image is 1 s/30 Hz=0.033 s=33 ms, and time required for capturing each row is 33 ms/480=69 us. In order to obtain a clear image containing bright or dark stripes with each stripe being corresponding to each row, the exposure time of each is less than 69 us and the sampling rate is higher than 30 Hz.

According to embodiments of the present invention, the step 210 may comprise capturing on an image sensor with a rolling shutter the one or more images in which different portions of the image sensor are exposed at different time points. Optionally, the image sensor may be a complementary metal-oxide-semiconductor (CMOS) image sensor or a Charge-Coupled Device (CCD) image sensor.

As shown in FIG. 7, after the step 210 described hereinbefore, step 220 of the method 200 is performed, wherein varied numbers of bright or dark stripes in the one or more images is measured, the varied numbers of bright or dark stripes being corresponding to the varied frequencies.

According to embodiments of the present invention, varied numbers of bright or dark stripes in the one or more images obtained from the visible light signal may be measured by, for example, an image processor or a general purpose processor. After the image is projected onto the image sensor surface, the optical signal detected by the image sensor is converted into electrical signal by the image sensor. The analog electrical signals are converted into digital signals by an analog-to-digital-converter (ADC) of the image sensor or the processor. The processor is applied to further process the digital signal, and generate a digital image, which may be displayed on a monitor. Optionally, a digital signal processing (DSP) module of the processor may be applied to process the digital signal and generate a digital image.

As shown in FIG. 7, after the step 220 described hereinbefore, step 230 of the method 200 may be performed, wherein information corresponding to the varied numbers of the bright or dark stripes is obtained.

According to embodiments of the present invention, the information corresponding to the pattern of the color stripes may be any type of information, for example, data such as text, picture, audio, and video data, the identifier (ID) of the light source, and other information.

According to embodiments of the present invention, the varied numbers of bright or dark stripes in the one or more images are derived from the varied frequencies of the visible light signal at different time points. According to embodiments of the present invention, the information corresponding to the varied numbers of bright or dark stripes may be decoded. By this way, the initial information carried on the visible light signal can be recovered.

As shown in FIGS. 3b, 3d and 3f, the images captured by an image sensor can be generated from the light source emitting visible light signal at different time points, which is driven by the modulated driving signal as shown in FIG. 3g. When decoding the information corresponding to the varied numbers of bright or dark stripes, the analysis of the captured images is based on the measurements of varied numbers of bright or dark stripes. For example, the image shown in FIG. 3b has 10 dark stripes and 11 bright stripes, and its decoded wave form corresponds to that in FIG. 3a or within ΔT1 as shown in FIG. 3g; the image shown in FIG. 3d has 5 dark stripes and 6 bright stripes, and its decoded wave form corresponds to that in FIG. 3c or within ΔT2 as shown in FIG. 3g;

the image shown in FIG. 3e has 3 dark stripes and 4 bright stripes, and its decoded wave form corresponds to that in FIG. 3e or within ΔT3 as shown in FIG. 3g.

It should be noted that although varied frequencies of the visible light signals at different time points are used during coding, the transmitted information may be decoded by comparing the relative frequencies corresponding to the numbers of the bright or dark stripes, instead of the absolute frequencies of the visible light signals.

According to embodiments of the present invention, the light source may be one or more light sources. One or more images from visible light signal emitted by the light source may be obtained at one or more time points. Each image obtained may have one or more exposed regions, and each exposed region may contain bright or dark stripes corresponding to one light source.

FIG. 8 is a schematic diagram of an image containing one or more exposed regions corresponding to one or more light sources according to an embodiment of the present invention. In FIG. 8, the image obtained has three exposed regions, and each exposed region contains bright or dark stripes, such as those shown in FIG. 3b, 3d or 3f, corresponding to one light source driven by the modulated driving signal, such as those shown in FIG. 3a, 3c or 3e.

The step 210 may comprise: obtaining one or more images at one or more time points from visible light signal having its level changed between a peak level and a bottom level with varied frequencies at different time points emitted by the one or more light sources, wherein one or more exposed regions in each image correspond to the one or more light sources. The image having one or more exposed regions obtained from one or more light source, for example the image shown in FIG. 8, may be obtained in the similar way as that obtained from one light source as mentioned above, which will not be iterated herein for the sake of conciseness. Further, the step 220 may comprise measuring the varied numbers of the bright or dark stripes of the one or more exposed regions in each image. The varied numbers of bright or dark stripes of each exposed region corresponding to each set light source may be measured in the similar way as mentioned above. For example, varied numbers of bright or dark stripes of each exposed region corresponding to each light source shown in FIG. 8 may be respectively measured in the similar way as those shown in FIGS. 3b, 3d and 3f, which will not be iterated herein for the sake of conciseness. Still further, the step 230 may comprise obtaining information corresponding to the varied numbers of the bright or dark stripes of the one or more exposed regions in each image. The information corresponding to the varied number of bright or dark stripes of each exposed regions in the image may be obtained respectively, in the similar way as that from one light source as mention above. For example, information corresponding to the varied number of bright or dark stripes of each exposed region corresponding to each light source shown in FIG. 8 may be respectively obtained in the similar way as that corresponding to those shown in FIGS. 3b, 3d and 3f, which will not be iterated herein for the sake of conciseness.

When the incident light is not in perpendicular with the plane of the image sensor, the shape of the light spot projected on the image sensor may have distortion, for example, from a circular to an ellipse. In this case, acceleration meter, gravity sensor, tilt sensor, gyro, or magnetic sensor may be applied to measure the angle of inclination, which may be used to obtain the information corresponding to the varied numbers of bright or dark stripes of the one or more exposed regions in the image.

According to embodiments of the present invention, the information corresponding to the varied numbers of bright or dark stripes comprises data bits which comprise data corresponding to the varied frequencies, and each data bit corresponds to a number among the varied numbers of bright or dark stripes.

With the modulated driving current as shown in FIG. 3g, the images as shown in FIGS. 3b, 3d and 3f may be obtained at different time points within time intervals ΔT1, ΔT2 and ΔT3. The information corresponding to the varied numbers of bright or dark stripes in the images as shown in FIGS. 3b, 3d and 3f may be transmitted. The information transmitted may comprise data bits which comprise data corresponding to the varied frequencies, such as $f_{3a}$, $f_{3c}$ and $f_{3e}$ at different time points within time intervals ΔT1, ΔT2 and ΔT3. Each data bit corresponds to a number among the varied numbers of bright or dark stripes. For example, 10 dark stripes and 11 bright stripes as shown in FIG. 3b may represent code "1", 5 dark stripes and 6 bright stripes as shown in FIG. 3d may represent code "2", and 3 dark stripes and 4 bright stripes as shown in FIG. 3f may represent code "3". Of course, the modulated driving current may have other combinations of signals with different frequencies or different durations.

According to embodiments of the present invention, the information corresponding to the varied numbers of bright or dark stripes further comprises one or more start bits and/or one or more error correction bits, the one or more start bits being used to identify a start position of a set of data bits, and the one or more error correction bits being used to check error in the data bits.

Referring to FIG. 5a again, the information corresponding to the varied numbers of bright or dark stripes may comprise a start bit according to an embodiment of the present invention. Optionally, a start bit is added at the beginning of the data bits. Alternatively, more than one start bits may be included.

Referring to FIG. 5b again, the information corresponding to the varied numbers of bright or dark stripes may comprise a start bit and an error correction bit according to an embodiment of the present invention. Optionally, besides a start bit, an error correction bit is also added at the end of the data bits. Alternatively, more than one error correction bits may be included. Alternatively, the one or more error correction bits may be added to the data bits without the start bit.

Figure 9:
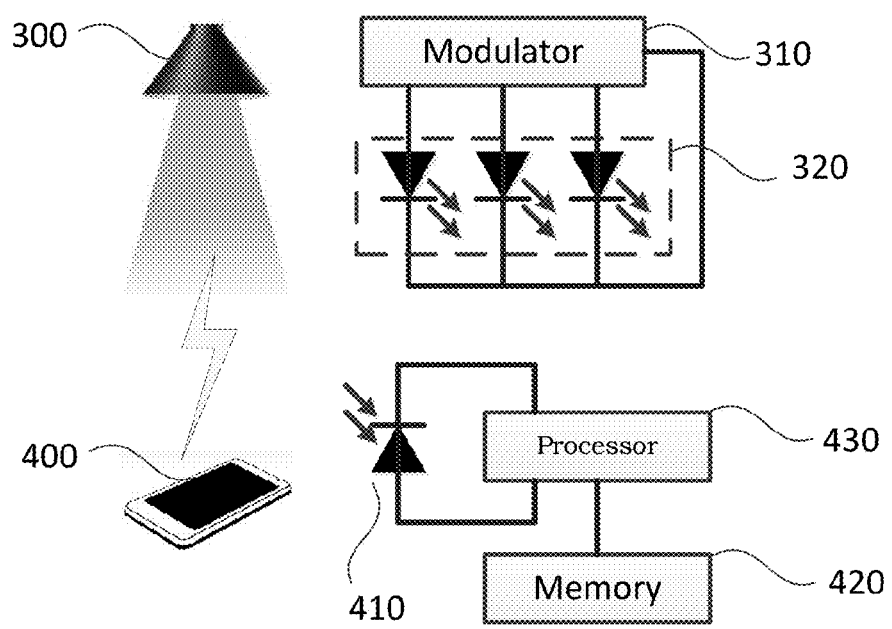
FIG. 9 is a schematic diagram of a light source and a device for transmitting information by visible light signal according to an embodiment of the present invention.

According to a third aspect of the present invention, there is provided a light source 300 for transmitting information by visible light signal. As shown in FIG. 9, the light source 300 may be a lamp, for example a LED lamp, LED backlight, LED flat light, etc. However, the light source 300 is not limited to the above example, but may be any light source capable of transmitting visible light signals.

As shown in FIG. 9, the light source 300 may comprise a modulator 310 and an emitter 320. The modulator 310 may be a modulator driven by an electric signal with constant current, constant voltage, constant electric power, constant optical power, or by an electric signal modulated by PWM. The emitter 320 may be a LED which may emit visible light signal having its level changed between a peak level and a bottom level with varied frequencies at different time points. As for one-way LED driving, the emitter 320 may be one or more LEDs connected in one string, including 1 to dozens of LEDs. Alternatively, the emitter 320 may be one or more LEDs connected in more strings with each string including 1 to dozens of LEDs. According to embodiments of the present invention, the emitter 320 comprises more LEDs. However, the modulator 310 or the emitter 320 is not limited to the above example, but may be any modulator or emitter.

The modulator 310 may be configured to modulate, on the basis of the information to be transmitted, a driving signal of the light source to obtain a modulated driving signal for driving the light source to emit visible light signal having its level changed between a peak level and a bottom level with varied frequencies at different time points.

The emitter 320 may be configured to emit the visible light signal having its level changed between a peak level and a bottom level with varied frequencies at different time points on the basis of the modulated driving signal, so as to transmit information corresponding to the varied numbers of bright or dark stripes shown in one or more images obtained from the visible light signal at one or more time points, which numbers are corresponding to the varied frequencies.

According to embodiments of the present invention, the modulator 310 may be configured to modulate on the basis of the information to be transmitted a driving voltage or a driving current of the light source to obtain a first modulated driving voltage or a first modulated driving current.

According to embodiments of the present invention, the first modulated driving current is greater than the un-modulated driving current, so that the luminous flux of the light source driven by the first modulated driving current is equal to the luminous flux of the light source driven by the un-modulated driving current.

According to embodiments of the present invention, the emitter 320 can be configured to emit the visible light signal on the basis of a second modulated driving current which is greater than the un-modulated driving current together with a high frequency carrier wave signal, so that luminous flux of the light source driven by the second modulated driving current is constant among periods comprising peak levels and bottom levels.

According to embodiments of the present invention, the information corresponding to the varied numbers of bright or dark stripes comprises data bits which comprise data corresponding to the varied frequencies, and each data bit corresponds to a number among the varied numbers of bright or dark stripes.

According to embodiments of the present invention, the information corresponding to the varied numbers of bright or dark stripes may further comprise one or more starts bit and/or one or more error correction bits, the start bits are used to identify a start position of a set of data bits, and the one or more error correction bits are used to check error in the data bits.

According to embodiments of the present invention, the first modulated driving voltage or the first modulated driving current is used for driving the light source to emit a visible light signal with a frequency from 100 Hz to 1.37 MHz, and duration of each bottom level of the visible light signal is fixed, or duration of each peak level of the visible light signal is fixed.

According to embodiments of the present invention, the light source 300 may further comprise a detector configured to detect the presence of a human being within an illumination scope of the light source, and the emitter is configured to emit a visible light signal on the basis of un-modulated driving signal in the absence of a human being.

The above detailed descriptions for the method 100 also apply to the embodiments of the light source 300 according to the present invention, and are thus not iterated for the sake of conciseness. In particular, the step 110 in the method 100 can be performed by the modulator 310, and the step 120 in the method 100 can be performed by the emitter 320.

According to a fourth aspect of the present invention, there is provided a device 400 for obtaining information from visible light signal. For example, the device may be a mobile device with a camera, such as a smartphone, tablet, laptop computer, or other electronic device. However, the device 400 is not limited to these examples, but can be any electronic device with photosensitive component.

As shown in FIG. 9, the device 400 for obtaining information from visible light signal may comprises an image sensor 410, a memory 420, and a processor 430. The image sensor 410 may be for example a camera, photodiode, and photodiode array. The memory 420 may be for example volatile memory, non-volatile memory, etc. The processor 430 may be general purpose processor, dedicated processor, etc.

The image sensor 410 can be configured to obtain one or more images at one or more time points from a visible light signal having its level changed between a peak level and a bottom level with varied frequencies at different time points emitted by a light source. The memory 420 can be configured to store the one or more images obtained by the image sensor at one or more time points. The processor 430 can be configured to measure varied numbers of bright or dark stripes in the one or more images stored in the memory 420 and obtain information corresponding to the varied numbers of the bright or dark stripes, the varied numbers of bright or dark stripes being corresponding to the varied frequencies.

According to embodiments of the present invention, exposure mode of the image sensor is rolling shutter mode, and a sampling rate of the rolling shutter is higher than the frame rate of the image sensor.

According to embodiments of the present invention, the image sensor 410 is an image sensor with a rolling shutter and is configured to obtain the one or more images in which different portions of the image sensor are exposed at different time points. Optionally, the image sensor 410 may be a complementary metal-oxide-semiconductor (CMOS) image sensor or a Charge-Coupled Device (CCD) image sensor.

According to embodiments of the present invention, the visible light signal is emitted by the light source 300 on the basis of a modulated driving signal, which drives the light source to emit the visible light signal having its level changed between a peak level and a bottom level with varied frequencies at different time points.

According to embodiments of the present invention, the light source 300 may be one or more sets of light sources, and the image sensor 410 can be configured to obtain one or more images at one or more time points from visible light signal having its level changed between a peak level and a bottom level with varied frequencies at different time points emitted by the one or more light sources, wherein one or more exposed regions in each image correspond to the one or more light sources; the memory 420 can be configured to store the one or more images obtained by the image sensor at one or more time points; and the processor 430 can be configured to measure the varied numbers of the bright or dark stripes of the one or more exposed regions in each image, and obtain information corresponding to the varied numbers of the bright or dark stripes of the one or more exposed regions in each image.

According to embodiments of the present invention, the information corresponding to the varied numbers of bright or dark stripes comprises data bits which comprise data corresponding to the varied frequencies, and each data bit corresponds to a number among the varied numbers of bright or dark stripes.

According to embodiments of the present invention, the information corresponding to the varied numbers of bright or dark stripes further comprises one or more start bits and/or one or more error correction bits, the one or more start bits being used to identify a start position of a set of data bits, and the one or more error correction bits being used to check error in the data bits.

The above detailed descriptions for the method 200 also apply to the embodiments of the device 400 according to the present invention, and are thus not iterated for the sake of conciseness. In particular, the step 210 in the method 200 as described above can be performed by the image sensor 410, and the steps 220 and 230 in the method 200 can be performed by the processor 430.

Figure 10:
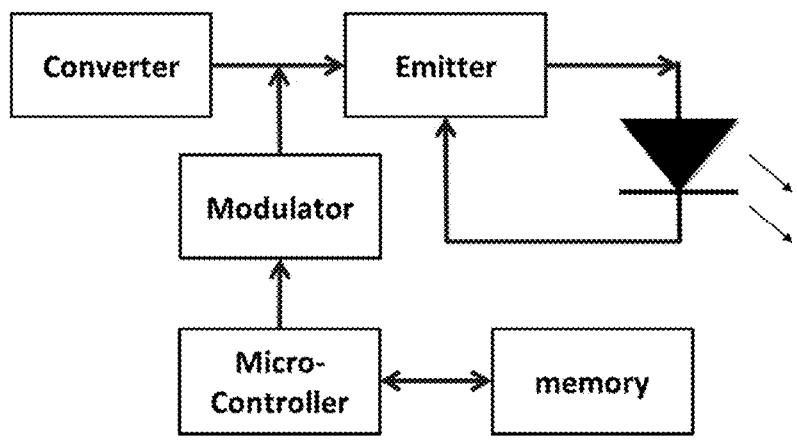
FIG. 10 is a schematic diagram of a light source comprising an AC/DC converter, a micro-controller and a memory according to an embodiment of the present invention.

According to embodiments of the present invention, the light source 300 may further comprises an AC/DC converter, a micro-controller and a memory, as shown in FIG. 10. The AC/DC converter is configured to convert the AC power of the light source 300 obtained from electric power supply to DC power. The micro-controller is configured to compile the pre-stored information in the memory to modulation signal based on pre-defined coding method. The modulator is configured to receive the modulation signal and modulate, on the basis of the information to be transmitted, a driving signal of the light source to obtain a modulated driving signal for driving the light source to emit visible light signal having its level changed between a peak level and a bottom level with varied frequencies at different time points.

Figure 11A:
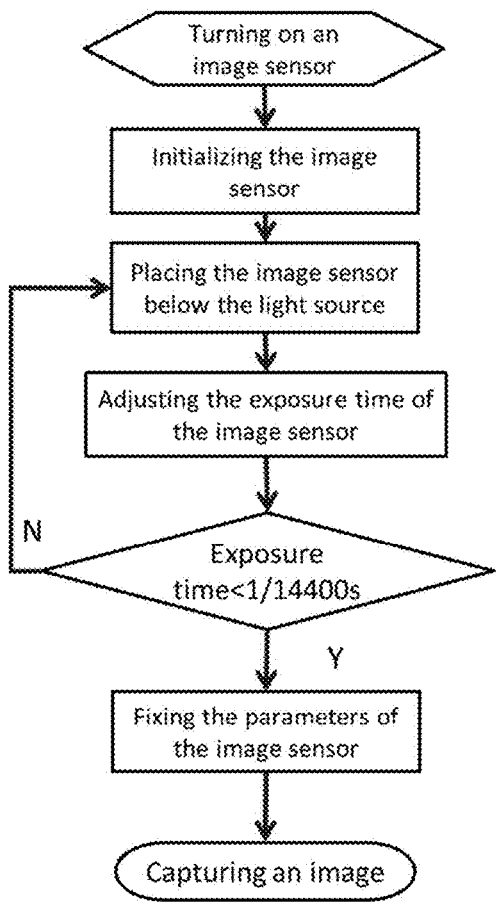
FIG. 11a is a flowchart of a process that the exposure time of the image sensor is adjusted before capturing an image according to an embodiment of the present invention.

According to embodiments of the present invention, the exposure time of the image sensor 410 may be adjusted before capturing an image. FIG. 11a is a flowchart of a process that the exposure time of the image sensor 410 is adjusted before capturing an image according to an embodiment of the present invention. An image sensor is turned on and the exposure time is adjusted. Optionally, the frame rate is 30 Hz and the resolution of each frame is 640*480. Since the light source is close to the image sensor, the light intensity is high. The exposure time of the image sensor may be set at a small value, such as $1/14400$ s. When the exposure time of the image sensor is less than $1/14400$ s, such exposure time is fixed by software. Then, the image sensor is ready to capture an image. By adjusting the exposure time of the image sensor, when the exposure time of the image sensor is short enough, images with bright or dark strips can be captured clearly for transmitting information. By this way, the communication between the light source and the image sensor is achieved.

Figure 11B:
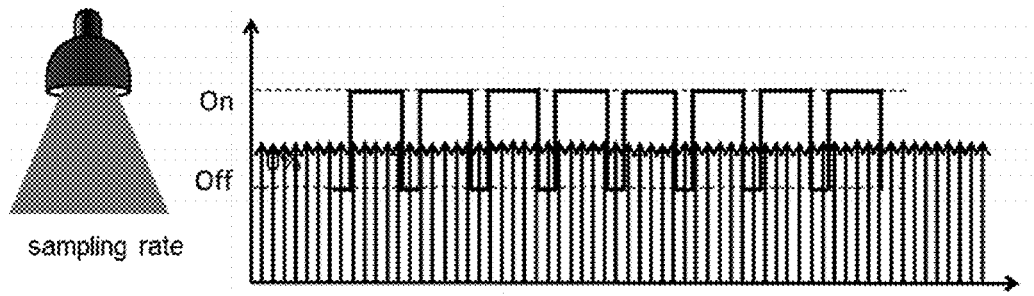
FIGS. 11b and 11c are schematic diagrams of the sampling duration rate of the image sensor and the duration of the peak level or bottom level of the visible light signal emitted by the light source according to an embodiment of the present invention.
Figure 11C:
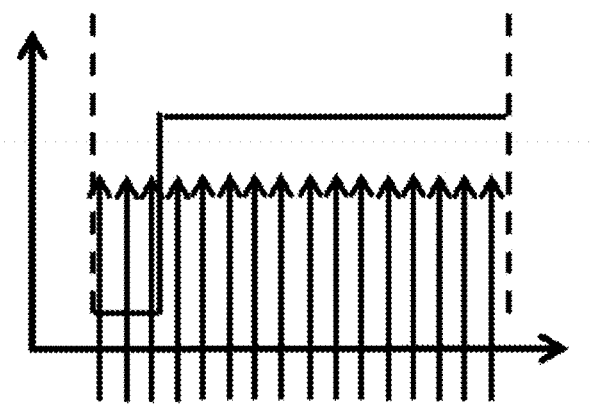
Figure 11D:
FIG. 11d is a schematic diagram of an image obtained from the visible light signal having the duration of the peak level of as shown in FIG. 11c according to an embodiment of the present invention.

According to embodiments of the present invention, in order to capture images with bright or dark stripes clearly, the sampling duration rate of the image sensor may be smaller or equal to the duration of the peak level or bottom level of the visible light signal emitted by the light source, as shown in FIG. 11b. For instance, in FIG. 11b, the duration of the bottom level is smaller compared to that of the peak level. In order to capture dark stripes clearly, which corresponds to the bottom level, the sampling duration of the image sensor is smaller or equal to the duration of the bottom level. In the case that the frequency of the visible light signal is fixed, the smaller the sampling duration, the clearer the bright or dark stripes obtained. For instance, as shown in FIG. 11c, within the duration of the bottom level of the visible light signal, a dark stripe having of 3 rows is obtained; and within the duration of the peak level of the visible light signal, a bright stripe having 13 rows is obtained. Similarly, an image as shown in FIG. 11d may be obtained, which contains bright or dark stripes as shown in FIG. 11c.

Figure 12A:
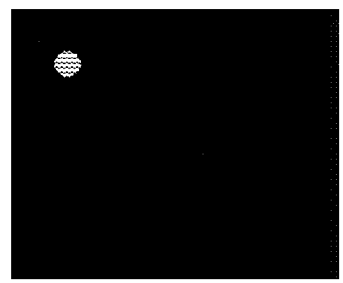
FIGS. 12a and 12b are schematic diagrams of the exposed region in the image detected according to an embodiment of the present invention.
Figure 12B:
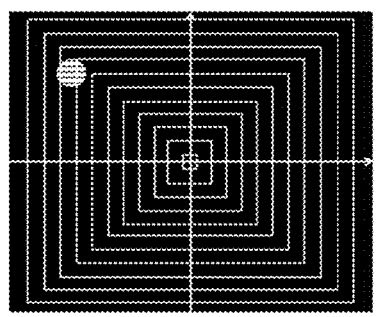

According to embodiments of the present invention, after the image is captured, the exposed region in the image is detected as shown in FIGS. 12a and 12b. Alternatively, the exposed region may be detected by software in following way: searching the exposed regions from the center of the image outwards along a spiral route; detecting the exposed region; and adjusting the exposure parameters of the image sensor according to the brightness of the exposed region.

Figure 13A:
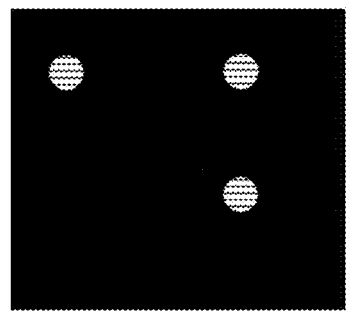
FIGS. 13a-13c are schematic diagrams of strategy for detecting the exposed region in the image according to an embodiment of the present invention.
Figure 13B:
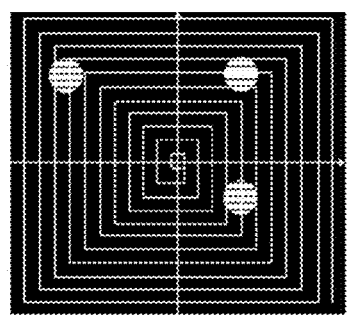
Figure 13C:
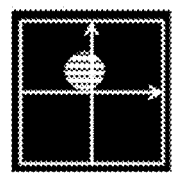

According to embodiments of the present invention, when the light source is one or more light sources, each image captured may contain one or more exposed regions corresponding to one or more light sources. The one or more exposed regions in the image may be detected as shown in FIGS. 13a-13c. FIG. 13a shows an image captured by an image sensor from one or more light sources. The one or more exposed regions on each image may be detected as shown in FIG. 13b in following way: searching the exposed regions from the center of the image outwards along a spiral route; dividing the image into one more regions corresponding to the one or more light sources; detecting each exposed region corresponding to each light source as shown in FIG. 13c; determining the number of the stripes; and obtaining the information transmitted.

Figure 14:
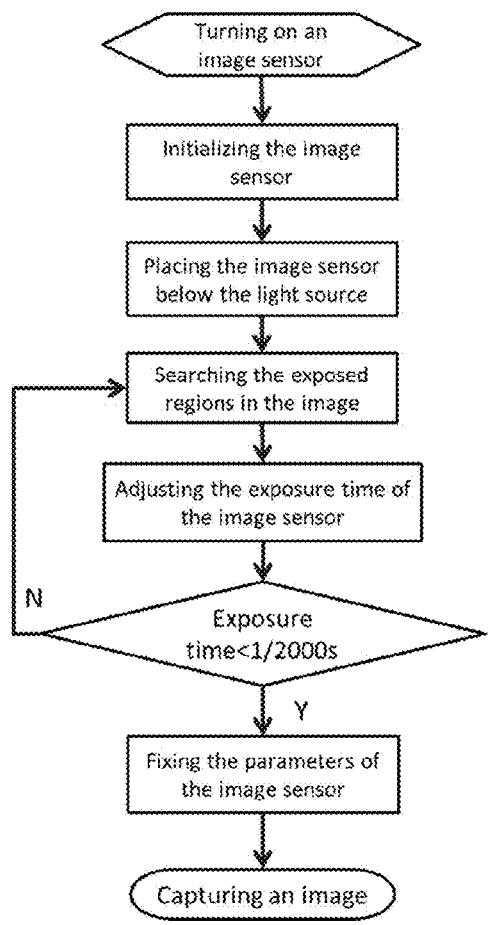
FIG. 14 is a flowchart of a process that the exposure time of the image sensor is adjusted before capturing an image according to an embodiment of the present invention.

According to embodiments of the present invention, the exposure time of the image sensor 410 may be adjusted before capturing an image. FIG. 14 is a flowchart of a process that the exposure time of the image sensor 410 is adjusted before capturing an image according to an embodiment of the present invention. When the light source is far away from the image sensor and the light intensity detected by the image sensor is low, the exposure time of the image sensor may be adjusted to a suitable value, based on the brightness in the center of the light source. When the exposure time of the image sensor is less than the suitable value, such exposure time is fixed by software. Then, the image sensor is ready to capture an image. Optionally, the frame rate is 30 Hz and the resolution of each frame is 640*480. The time for the image sensor to capture one image is 1 s/30 Hz=0.033 s=33 ms, and the time for capturing each row is 33 ms/480=69 us≈70 us. When the exposure time is fixed to $1/2000$ s corresponds to the time for capturing ($1/2000$ s)/70 us=7.2 rows. In order to capture images with bright and dark strips clearly for transmitting information, the duration of the bottom level corresponding to dark stripes or the duration of the peak level corresponding to bright stripes should be larger than the exposure time $1/2000$ s, and thus the width of the dark or bright stripes should be larger than 7 rows. Optionally, the exposure time may be set as an interface according to underlying software agreement and this interface can be directly applied to the application software. When an image sensor is turned on, the exposure time is set directly by the application layer interface.

According to embodiments of the present invention, the captured image containing bright and dark stripes may be decoded, optionally by decoding software, in the following manner: capturing one or more images from the visible light signal emitted by a light source; determining one or more exposed regions in each image; measuring the number of the bright or dark strips where different number represents different code; and recovering the transmitted information.

Figure 15A:
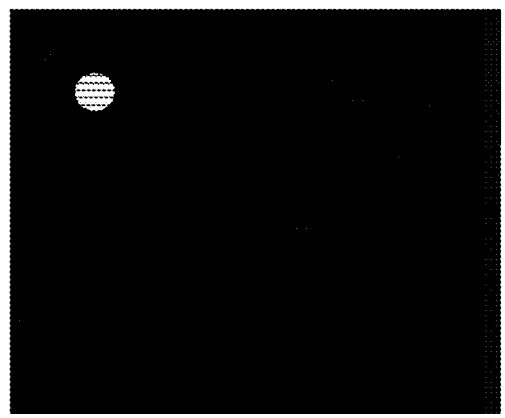
FIG. 15a is a schematic diagram of the image captured by the image sensor according to embodiments of the present invention.

FIG. 15a is a schematic diagram of the image captured by the image sensor, according to embodiments of the present invention.

Figure 15B:
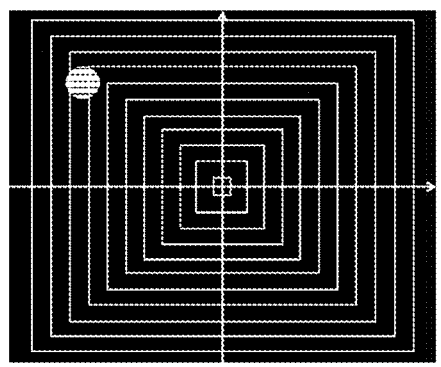
FIG. 15b is a schematic diagram of the exposed region within the image being searched from the center of the image outwards along a spiral route according to embodiments of the present invention.
Figure 15C:
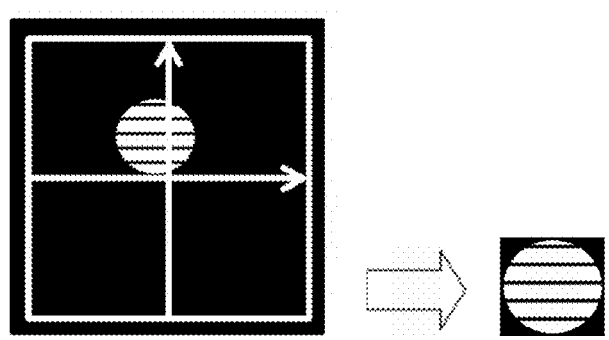
FIG. 15c is a schematic diagram of the determined rectangular exposed region in the image according to an embodiment of the present invention.
Figure 15D:
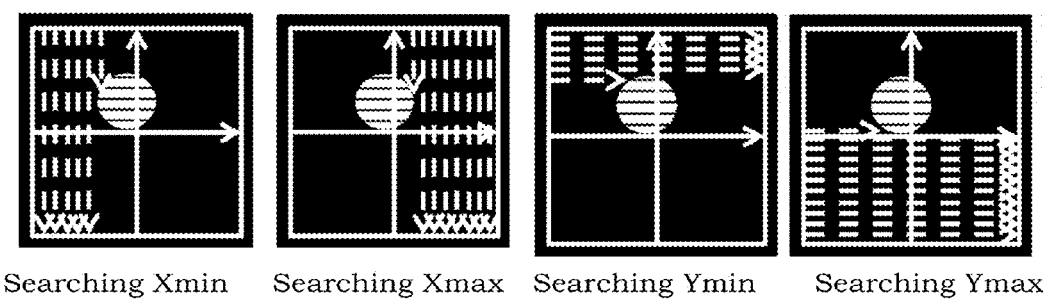
FIG. 15d is a schematic diagram of determining the coordinates of the rectangular exposed region in the image according to an embodiment of the present invention.

Alternatively, the exposed region within the image is searched from the center of the image outwards along a spiral route, optionally, by pre-installed software, as shown in FIG. 15b, according to embodiments of the present invention. Alternatively, the exposed region may be determined by searching pixels with gray scale values higher than a threshold value. For instance, for an image to be analyzed with a resolution of 640*480, a threshold value is set to the average value of the gray scale of all pixels; the exposed region is searched from the center of the image outwards along a spiral route; when there are a plurality of pixels with gray scale values higher than the threshold in a region, this region is determined as a exposed region. Alternatively, the determined exposed region may be a rectangular region in the image according to embodiments of the present invention, as shown in FIG. 15c, with the coordinates of the four corners of the rectangle $(x_{min},y_{min})$, $(x_{max},y_{min})$, $(x_{min},y_{max})$ and $(x_{max},y_{max})$. Here, $x_{min}$ and $x_{max}$ are the minimum and maximum coordinates on the x-axis of the pixels with gray scale values higher than the threshold, respectively; $y_{min}$ and $y_{max}$ are the minimum and maximum coordinates on the y-axis of the pixels with gray scale values higher than the threshold, respectively. And the center of the exposed region is: $(x_{mid}, y_{mid})$, where $x_{mid}=(x_{min}+x_{max})/2$ and $y_{mid}=(y_{min}+y_{max})/2$. Alternatively, the coordinates may be obtained by scanning, comparing and screening each pixel in the image, as shown in FIG. 15d. Alternatively, since the light source generally has a circular shape, the determined exposed region may be further optimized to eliminate the interference from the non-exposed region though the center $(x_{mid}, y_{mid})$, that is, the coordinates of the four corners of the exposed region is determined as $(x_{mid}-5,y_{min})$, $(x_{mid}+5,y_{min})$, $(x_{mid}-5,y_{max})$ and $(x_{mid}+5,y_{max})$ as shown in FIG. 15e.

Figures 15E, 15F:
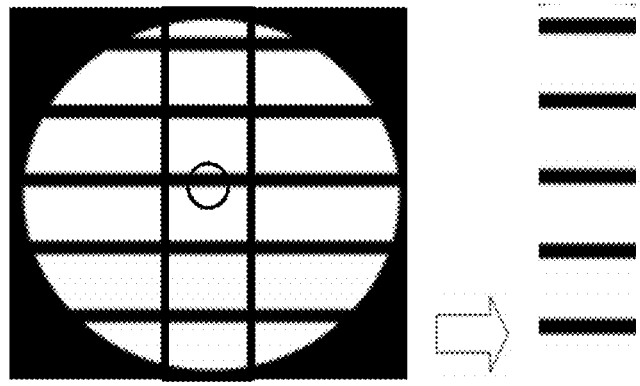
FIG. 15e is a schematic diagram of optimized exposed region in the image according to an embodiment of the present invention.
FIG. 15f is a schematic diagram of measuring the number of the bright or dark strips according to an embodiment of the present invention.

Alternatively, the number of the bright or dark strips within the optimized exposed region may be measured by measuring the gray scale value within the optimized exposed region according to embodiments of the present invention, as shown in FIG. 15f. The RGB-based color image is converted to the gray-scale image and the gray scale value of each pixel in the image is measured. Optionally, the minimum and maximum gray scale values are set to 0 and 255, respectively, corresponding to brightness levels from the darkest to the brightest. Optionally, a gray scale threshold is set to the average of the maximum and minimum gray scale values, or the average of the gray scale values of all pixels within the exposed region. The measured gray scale value of each pixel is compared with the gray scale threshold; and if the measured gray scale value of a pixel is higher the gray scale threshold, the pixel is assigned a gray scale dualization value of "1", otherwise the pixel is assigned a gray scale dualization value of "0". The gray scale dualizaton values of the pixels in the same row are summed and compared with a dualization threshold. Optionally, the dualization threshold is set to the average of the maximum and minimum of the sum of gray scale dualizaton values in a row, or is set to the average of the sum of gray scale dualizaton values in all rows within the exposed region. If the sum of gray scale dualizaton values of the pixels in the row is higher than the dualization threshold, the dualization value of the row is set to "1", representing bright stripe; otherwise, the dualization value of the row is set to "0", representing dark stripe.

Alternatively, the number of the bright or dark strips may be measured according to embodiments of the present invention, as shown in FIG. 15f. As described above, the dualization value "1" represents bright stripe and the dualization value "0" represents dark stripe. When the dualization value of a row is "0" and the dualization value of the next row is "1", it means the transition from a dark stripe to a bright stripe; when the dualization value of a row is "1" and the dualization value of the next row is "0", it means the transition from a bright stripe to a dark stripe; when the dualization value of a row is "1" and the dualization value of the next row is still "1", it means the two rows of pixels are still within one bright stripe; when the dualization value of a row is "0" and the dualization value of the next row is still "0", it means the two rows of pixels are still within one dark stripe. By this way, the transmitted information may be decoded by measuring the number of the dark stripes, by measuring the number of the bright stripes, or by collectively measuring the number of the bright or dark stripes, where different number represents different code. For example, in FIG. 15f, the number of the dark stripes is 5, the number of the bright stripes is 6, and the number of the bright or dark stripes is 11.

Figures 15G, 16:
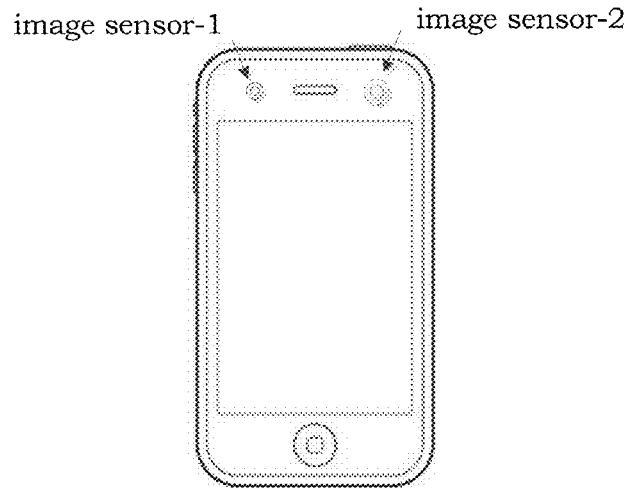
FIG. 15g is a schematic diagram of measuring the number of the bright or dark strips according to another embodiment of the present invention.
FIG. 16 is a schematic diagram of a device containing multiple image sensors according to an embodiment of the present invention.

Alternatively, the number of the bright or dark strips may be measured according to another embodiment of the present invention, as shown in FIG. 15g. In FIG. 15g, the first-order derivative of the sum of gray scale dualization values is calculated. The sign (positive or negative) of the first-order derivatives is further derivated. If the derivative of the sign is larger than 0, it means the transition from a bright stripe to a dark stripe or from a dark stripe to a bright stripe. The number of the bright or dark stripes may be obtained by calculating the number of the derivative of the sign larger than 0.

According to embodiments of the present invention, the device 400 may contain multiple image sensors as shown in FIG. 16. When using multiple image sensors in the device, it is necessary to pre-determine which image sensor is activated. Optionally, the strategy may be as follows: activating all image sensors; choosing the image sensor which receives the light signal first as an activated image sensor, and switching off other image sensors. Optionally, the strategy may be manually choosing one image sensor as an activated image sensor. Optionally, the strategy may be choosing one image sensor as an activated image sensor based on the information collected by other image sensors or processors to obtain the information corresponding to the varied numbers of bright or dark stripes of the one or more exposed regions in the image.

Figure 17A:
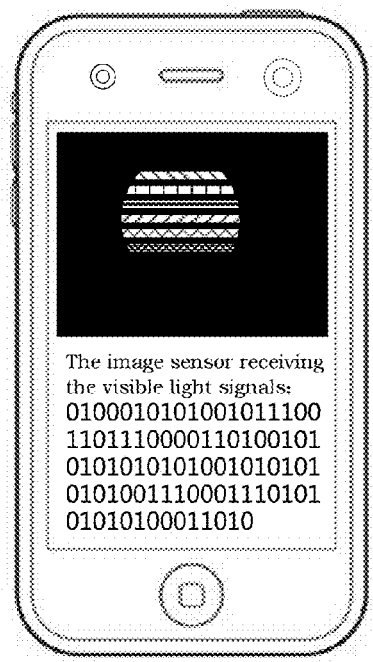
FIG. 17A is a schematic diagram of an interface with the real-time image and the information obtained therefrom displayed in full screen according to an embodiment of the present invention.
Figure 17B:
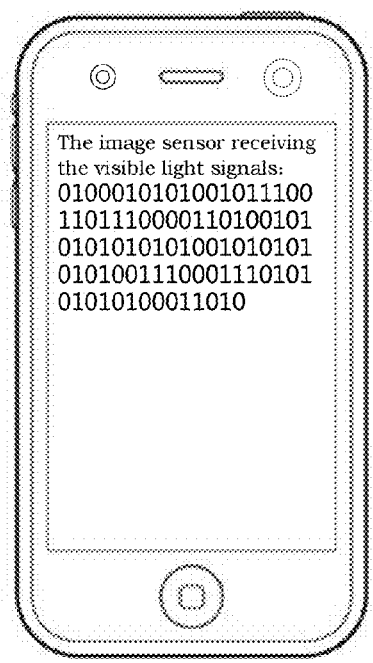
FIG. 17B is a schematic diagram of an interface with the information obtained from the image displayed according to an embodiment of the present invention.

According to embodiments of the present invention, a software program may be used to trigger the image sensor in the device for obtaining information from visible light signal to start receiving the visible light signal. Optionally, the real-time image and the information obtained therefrom may be displayed in the program during the process of capturing image, as shown in FIG. 17A. Optionally, only the information obtained from the image may be displayed in the program during the process of capturing image, as shown in FIG. 17B.

Figure 18:
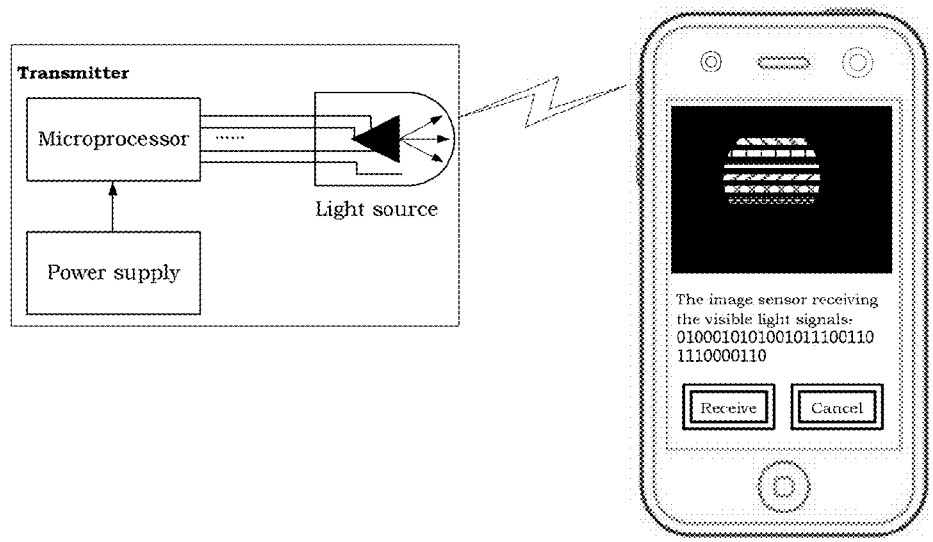
FIG. 18 is a schematic diagram showing an embodiment of the present invention with a device for obtaining information from visible light signals comprising an image sensor activated by an activation signal sent by the transmitter.

According to embodiments of the present invention, a light source for transmitting information by visible light signal comprising a modulator and an emitter according to the present invention may be included in a transmitter as shown in FIG. 18. The transmitter may further comprise a power supply, and a microprocessor, e.g., a micro controller unit (MCU). Before the visible light signal is ready to be emitted by the transmitter, the image sensor should be activated in advance. Optionally, the image sensor may be activated by an activation signal sent by the transmitter, as shown in FIG. 18. The activation may be realized by a software-based switch. When this switch is turned on, the image sensor starts receiving the visible light signal. Alternatively, the image sensor may be activated by other manners. For instance, when the software begins to operate, the image sensor is activated at the same time. Optionally, the activation can also be achieved by other switches, sensors or network.

Figure 19:
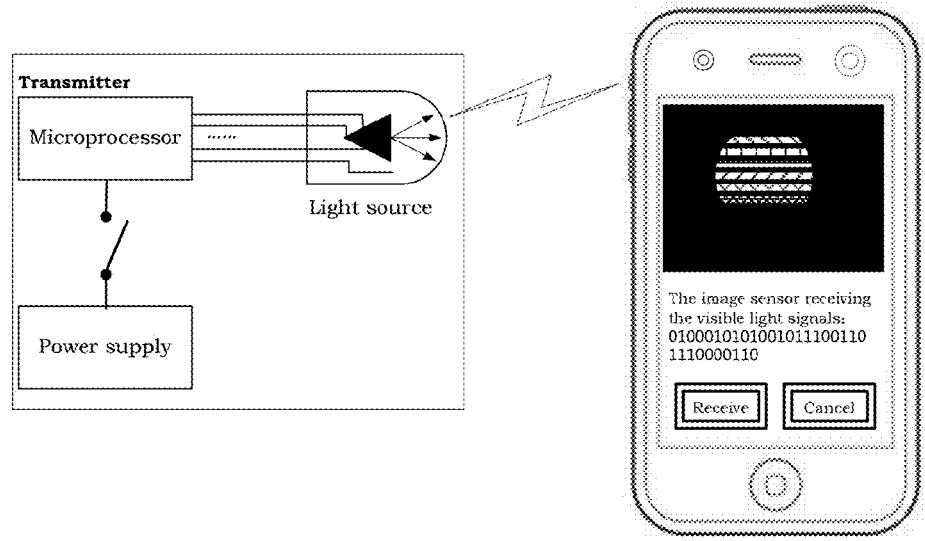
FIG. 19 is a schematic diagram showing an embodiment of the present invention with a hardware-based switch installed on the transmitter for activating the image sensor in the device for obtaining information from visible light signals.

According to embodiments of the present invention, when the image sensor is activated to receive the visible light signal, the transmitter is informed to send the visible light signal. This can be realized by a hardware-based switch installed on the transmitter, as shown in FIG. 19. When this switch is turned, the transmitter starts to send the visible light signal; when the switch is turned off, the transmitter stops sending the visible light signal. Alternatively, the transmitter may be informed by other manners, such as, buttons, physical contact, sensors, and network.

Figure 20:
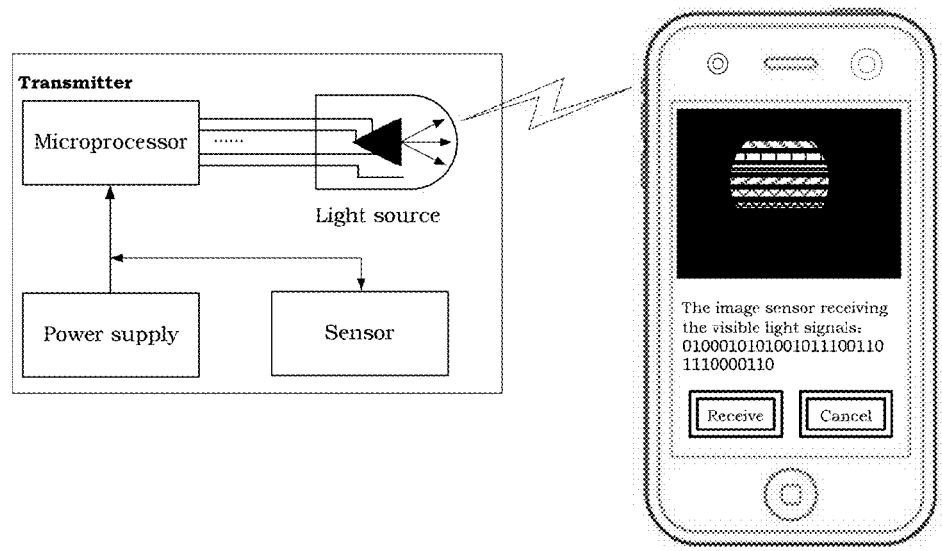
FIG. 20 is a schematic diagram showing an embodiment of the present invention with a sensor integrated in the emitter.

According to embodiments of the present invention, a photosensitive device may be integrated in the transmitter to detect the state of the image sensor, such as whether the image sensor is ready to capture images. Before the transmitter sends the visible light signal, the photosensitive device may first check the state of the image sensor. Optionally, when the image sensor is ready to capture images, the light emitting component of the image sensor changes the brightness at a certain frequency, and such changes of the brightness can be detected by the photosensitive device integrated in the transmitter; and then the transmitter starts to send the visible light signal, as shown in FIG. 20. Alternatively, the state of the image sensor may be detected by other sensors, such as, sound sensor, gravity sensor, acceleration meter, etc. Alternatively, the state of the image sensor may be detected by other manners, such as, network adaptors, for example GPRS, GSM, CDMA, WiFi, Zigbee, Bluetooth, RFID, etc.

Figure 21:
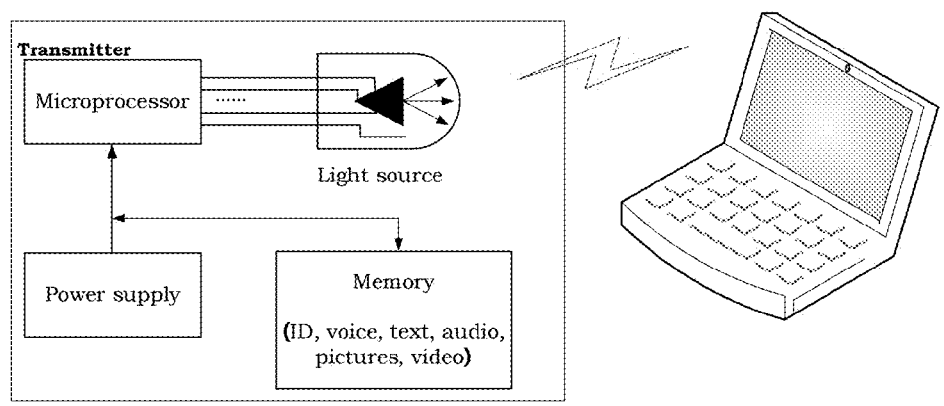
FIG. 21 is a schematic diagram showing an embodiment of the present invention with a transmitter for transmitting multiple types of information.

According to embodiments of the present invention, the transmitter may transmit multiple types of information, comprising but not limited to, identifier (ID) of the transmitter, voice, text, audio, pictures, video, etc., which may be stored in the memory, as shown in FIG. 21.

Figure 22:
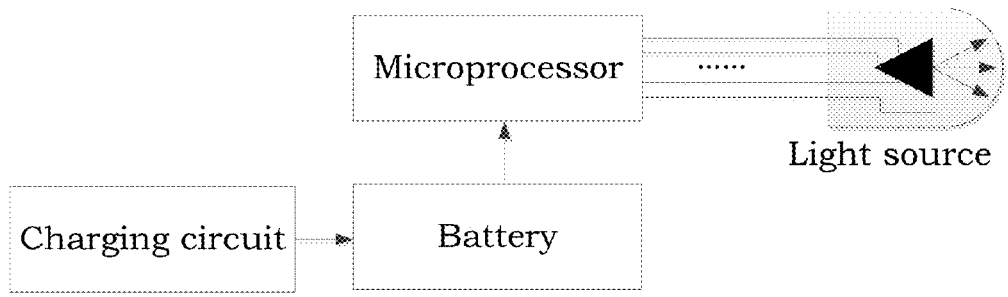
FIG. 22 is a schematic diagram showing an embodiment of the present invention with a transmitter comprising a light source, a processor, a battery, and a charging circuit.

According to embodiments of the present invention, the transmitter may comprise a light source according to the present invention, a microprocessor (for example a MCU), and a battery, as shown in FIG. 22. The microprocessor encodes the driving current/voltage of the light source, a modulator in the light source may modulate the driving current/voltage of the light source on the basis of the information to be transmitted, and an emitter in the light source may emit the visible light signal on the basis of the modulated driving current/voltage. The light source may emit visible light signal having its level changed between a peak level and a bottom level with varied frequencies at different time points. The battery may be used to provide energy for the light source and the microprocessor. Optionally, as shown in FIG. 22, the transmitter may further comprise a charging circuit applied for charging the battery or protecting the battery from being overcharged or overheated, etc.

Figure 23:
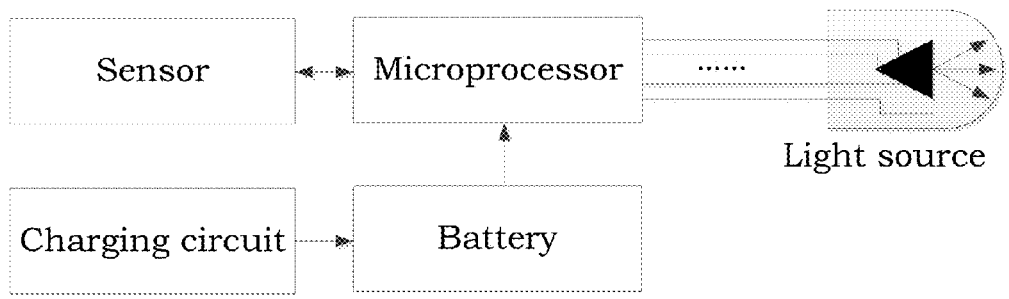
FIG. 23 is a schematic diagram showing an embodiment of the present invention with a transmitter comprising a light source, a processor, a battery, a charging circuit, and a sensor.

According to embodiments of the present invention, the transmitter may further comprise a sensor as shown in FIG. 23. The sensor may be applied for measuring electrical parameters, such as temperature, humidity, voltage, and current, or biological parameters, such as human heart rate, body temperature, and blood pressure.

Figure 24:
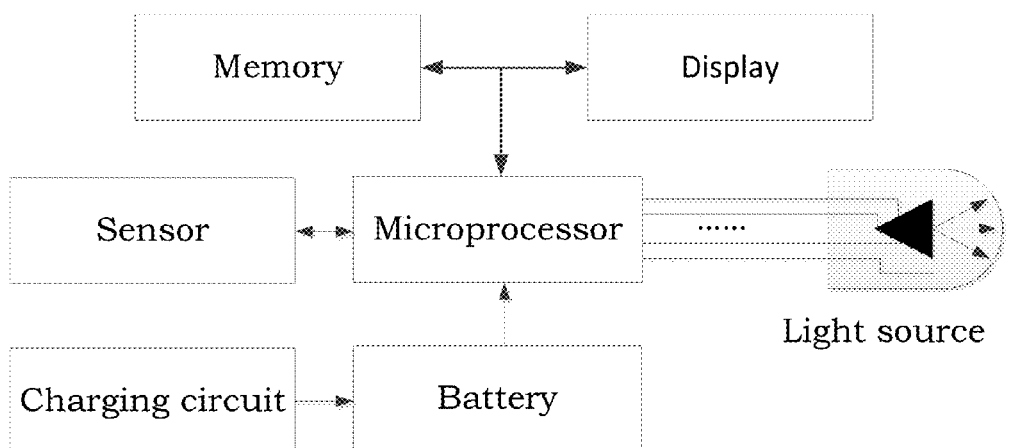
FIG. 24 is a schematic diagram showing an embodiment of the present invention with a transmitter comprising a light source, a processor, a battery, a charging circuit, a sensor, and a memory.

According to embodiments of the present invention, the transmitter may further comprise a memory as shown in FIG. 24. The memory is applied for storing information, such as pre-stored data, and information collected by sensors.

According to embodiments of the present invention, the transmitter may further comprise a display as shown in FIG. 24. The display is applied for showing the transmitted information.

Figure 25:
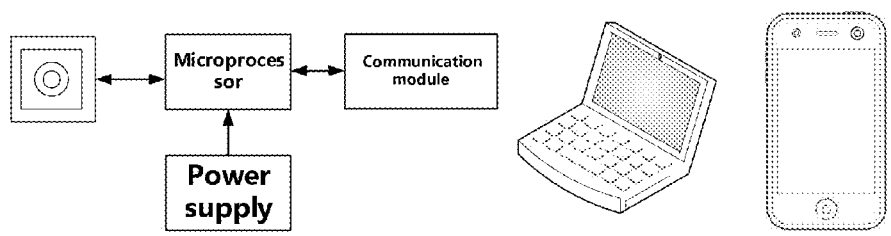
FIG. 25 is a schematic diagram of the device for obtaining information according to an embodiment of the present invention.

According to embodiments of the present invention, the device for obtaining information may comprise an image sensor, a microprocessor (for example a MCU) and a power supply, as shown in FIG. 25. The image sensor is applied for capturing the visible light signals mitted by the light source. The processor is applied for measuring the varied numbers of bright or dark stripes contained in the captured image and obtaining information corresponding to the varied numbers of bright or dark stripes. The power supply is used to provide energy for the processor.

According to embodiments of the present invention, the device for obtaining information from visible light signal having its level changed between a peak level and a bottom level with varied frequencies according to embodiments of the present invention may further comprise a communication module, as shown in FIG. 25. The communication module may be wired or wireless, and may be applied for data transmission between the device and other electronic devices, or connecting the device to Internet.

Figure 26:
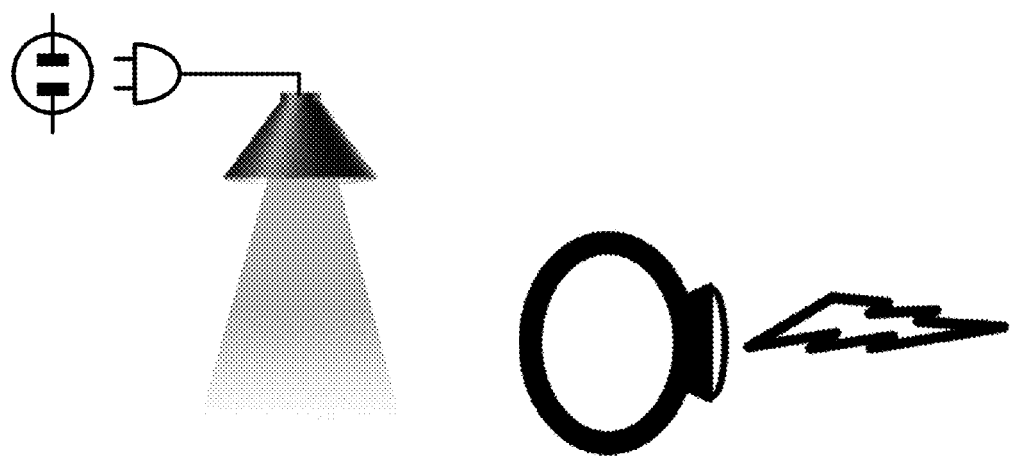
FIG. 26 is a schematic diagram showing an embodiment of the present invention with an image sensor integrated in a ring.

According to embodiments of the present invention, the transmitter could be a lamp. The transmitter may be an embedded system integrated in other devices, such as an integrated part of a ring, as shown in FIG. 26.

According to embodiments of the present invention, the basic working principle of the system for transmitting and obtaining information by visible light signal comprising a light source for transmitting information by visible light signal having its level changed between a peak level and a bottom level with varied frequencies at different time points and a device for obtaining information from visible light signal from light source according to embodiments of the present invention is as follows: the image sensor in the device captures the visible light signal emitted by the light source and obtain one or more images therefrom, and the processor in the device measures the varied numbers of bright or dark stripes in each image and recovers the information corresponding to the varied numbers of bright or dark stripes.

According to embodiments of the present invention, the transmitter may be integrated in a wearable electronic device, providing advantages of small in volume, easy to carry, and low in power consumption. The wearable electronic device may be a jewelry, such as a ring, an earrings, a necklace, a watches, etc., or maybe a key, a card, a pen, etc. When the transmitter is integrated in the wearable electronic device, such wearable electronic device can emit visible light signals for transmitting information.

Figure 27:
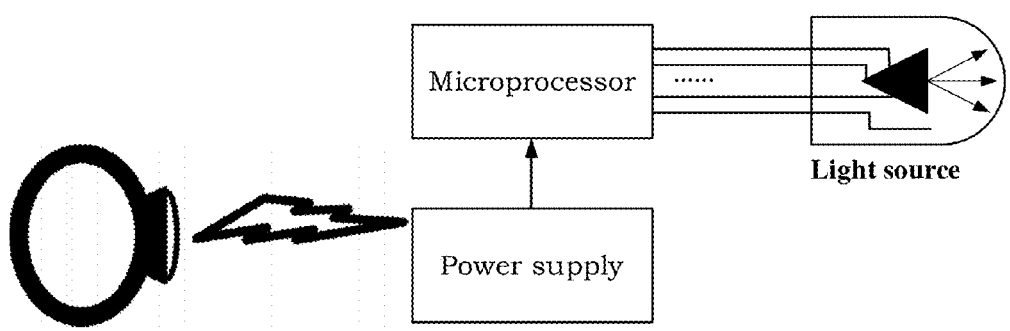
FIG. 27 is a schematic diagram showing an embodiment of the present invention with a transmitter integrated in a wearable electronic device powered by a power supply.

According to embodiments of the present invention, the transmitter may be integrated in a wearable electronic device, such as a ring powered by a battery, as shown in FIG. 27. It should be noted that the ring is only used for illustrating the present invention, but should not be considered as the limitation to the present invention. The battery is used to provide energy for the transmitter. The light source included in the transmitter can emit visible light having its level changed between a peak level and a bottom level with varied frequencies at different time points and each light source may be modulated independently.

Figure 28:
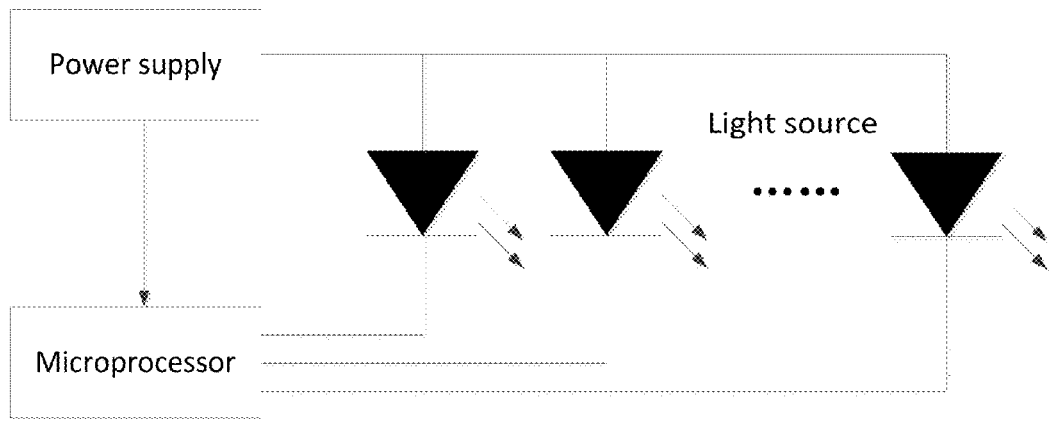
FIG. 28 is a schematic diagram of a transmitter comprising two or more light sources and a microprocessor according to an embodiment of the present invention.

According to embodiments of the present invention, the transmitter may comprise one or more light sources that can emit visible light signals having their level changed between peak levels and bottom levels with varied frequencies at different time points, as shown in FIG. 28. One or more exposed regions in each image correspond to the one or more light sources. As described before, the transmitter may be integrated in a wearable electronic device.

Figure 29:
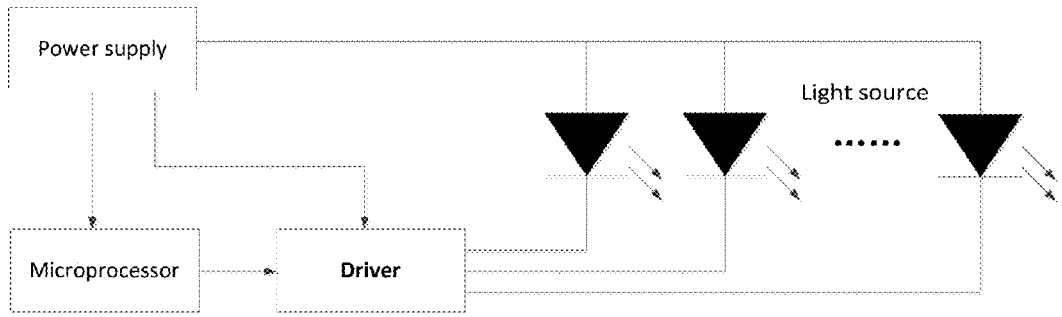
FIG. 29 is a schematic diagram of a transmitter comprising two or more light sources, a microprocessor, and a driver according to an embodiment of the present invention.

According to embodiments of the present invention, the transmitter may further comprise a driver, as shown in FIG. 29. As described before, the transmitter may be integrated in a wearable electronic device. The driver is added to drive the light source. The driver can supply larger driving current or driving voltage to drive high-power light source. In this way, the transmission distance of transmitter can be increased.

Figure 30:
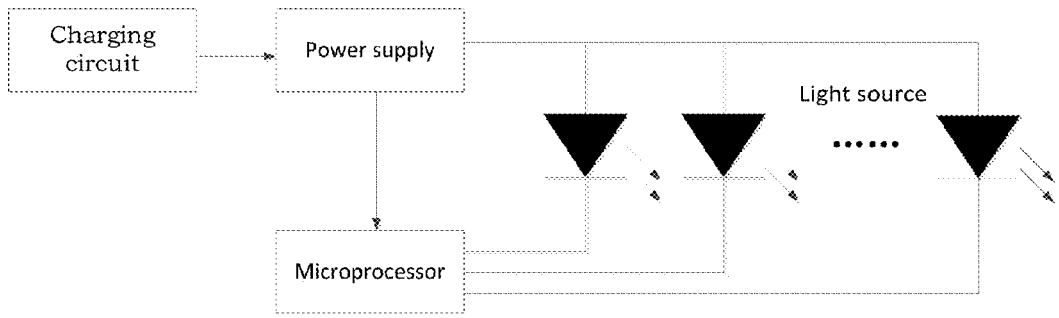
FIG. 30 is a schematic diagram of a transmitter comprising a microprocessor and a battery charging circuit according to an embodiment of the present invention.

According to embodiments of the present invention, the transmitter may further comprise a battery charging circuit, as shown in FIG. 30. As described before, the transmitter may be integrated in a wearable electronic device. The charging circuit is applied not only for charging the battery, but also for limiting the charging current/voltage or checking the temperature, etc., so as to protect the battery from being overcharged or overheated. Optionally, the charging circuit can be powered by an external power source, such as power mains, solar panel, generator, or energy harvesting system, etc. Optionally, the charging circuit can be a wireless charging system.

Figure 31:
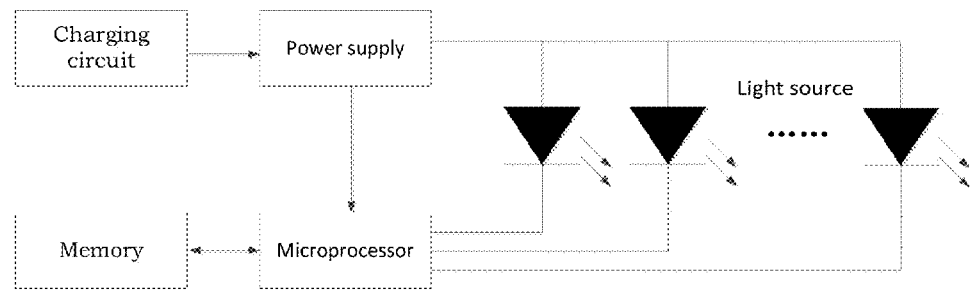
FIG. 31 is a schematic diagram of a transmitter comprising a microprocessor, a battery charging circuit, and a memory according to an embodiment of the present invention.

According to embodiments of the present invention, the transmitter may further comprise a memory as shown in FIG. 31. As described before, the transmitter may be integrated in a wearable electronic device. The memory is applied for storing information, such as pre-stored data, and the information collected by the image sensor.

Figure 32:
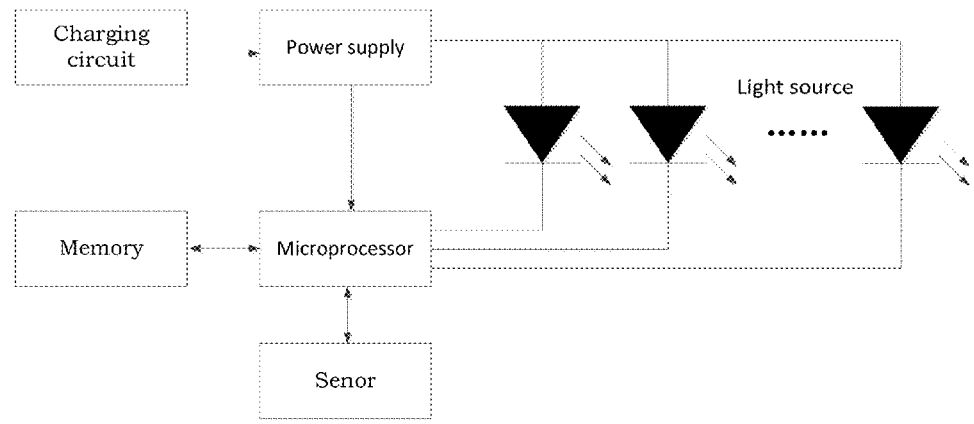
FIG. 32 is a schematic diagram of a transmitter comprising a microprocessor, a battery charging circuit, a memory, and a sensor according to an embodiment of the present invention.

According to embodiments of the present invention, the transmitter may further comprise a sensor as shown in FIG. 32. As described before, the transmitter may be integrated in a wearable electronic device. The sensor may be applied for measuring parameters, such as temperature, humidity, voltage and current, or biological parameters, such as human heart rate, body temperature and blood pressure. Such sensor could be a temperature sensor, humidity sensor, optical sensor, sound sensor, accelerometer, pressure sensor, etc. The transmitter may also comprise a voltage/current sensing circuit, which is applied for detecting the state of the battery. If a low battery is detected, the transmitter may inform the user by signal of light, sound, vibration, etc.

Figure 33:
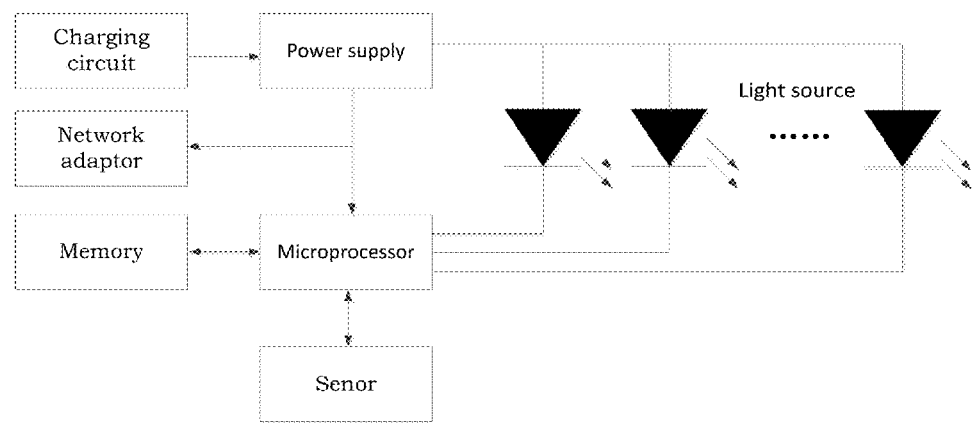
FIG. 33 is a schematic diagram of a transmitter comprising a microprocessor, a battery charging circuit, a memory, a sensor, and a network adaptor according to an embodiment of the present invention.

According to embodiments of the present invention, the transmitter may further comprise a network adaptor as shown in FIG. 33. As described before, the transmitter may be integrated in a wearable electronic device. The network adapter is applied for data exchange between the device for obtaining information from visible light signal and other electronic devices with network capability, e.g., a computer; or sending commands to control other devices. Optionally, the network adapter may use following communication technologies: GPRS, GSM, CDMA, WiFi, Zigbee, Bluetooth, RFID, etc.

Figure 34:
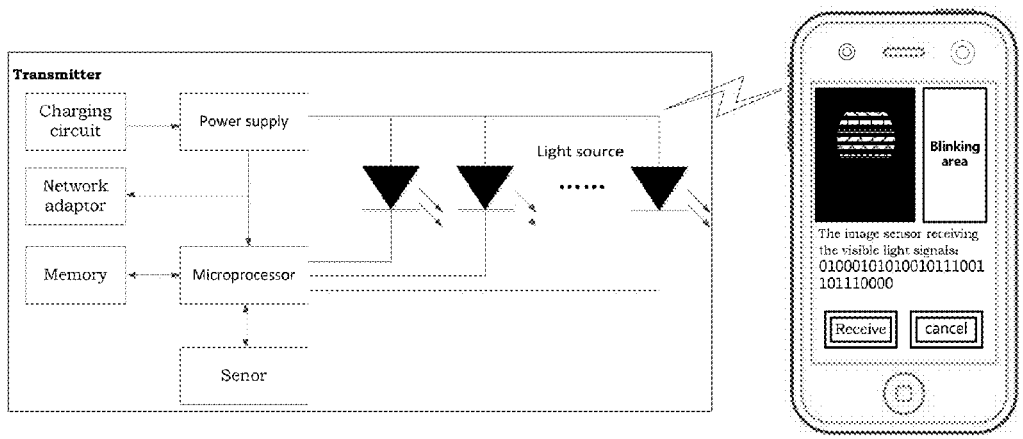
FIG. 34 is a schematic diagram illustrating communication between a transmitter and a device for obtaining information from visible light signals comprising an image sensor according to an embodiment of the present invention.

According to embodiments of the present invention, before the transmitter sends the visible light signal, the transmitter may first check the state of the image sensor in the device for obtaining information from visible light signal. Optionally, when the image sensor is ready to capture images, the screen of the light emitting component changes the brightness at a certain frequency, and such changes of the brightness can be detected by the photosensitive device (e.g., a sensor) integrated in the transmitter; and then the transmitter starts to send the visible light signal, as shown in FIG. 34. Optionally, when the device for obtaining information from is a smartphone, a LED flashlight embedded in the smartphone may be used to send signals to the transmitter. Alternatively, the state of the device for obtaining information from visible light signals may be detected by other sensors, such as, sound sensor, gravity sensor, acceleration meter, etc. Alternatively, the state of the device for obtaining information from visible light signals may be detected by other manners, such as, network adaptors, for example GPRS, GSM, CDMA, WiFi, Zigbee, Bluetooth, RFID, etc. Alternatively, the device for obtaining information from visible light signal may be a laptop computer or other electronic devices which have photosensitive component(s).

Figure 35:
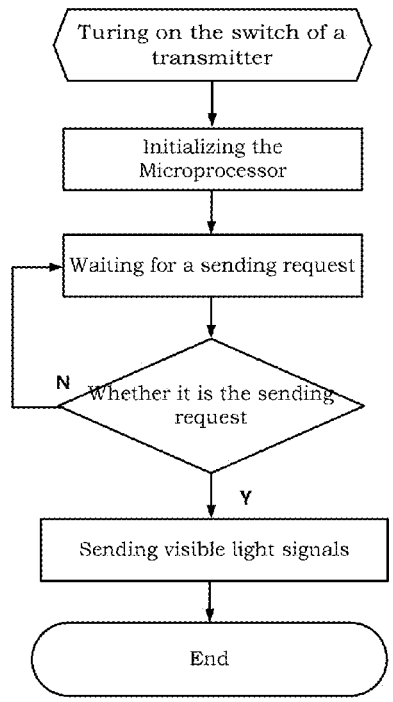
FIG. 35 is a flowchart of a process that a transmitter sends visible light signals according to an embodiment of the present invention.

According to embodiments of the present invention, the transmitter is integrated in a wearable electronic device. When the wearable electronic device starts to send the visible light signals, its transmitter should be turned on. This can be realized by a hardware-based switch installed on the transmitter, or other sensor-based switch connected to the transmitter. When the wearable electronic device receives the switch-on signal, it starts to send light signal. The above described process is illustrated in FIG. 35.

Figure 36:
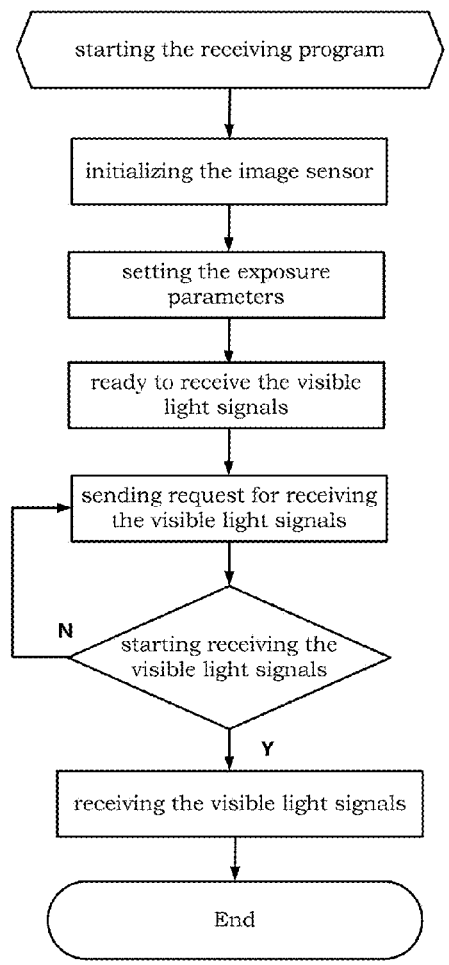
FIG. 36 is a flowchart of a process that an image sensor receives the visible light signals according to an embodiment of the present invention.

According to embodiments of the present invention, after a transmitter starts to send the visible light signal, the working flow of the image sensor in the device for obtaining information from visible light signal is as follows, as shown in FIG. 36: starting the receiving program, initializing the image sensor, setting the exposure parameters, sending request for receiving the visible light signal and waiting for the visible light signal; after receiving the visible light signal, checking the start code, analyzing the captured images, measuring the varied numbers of bright or dark stripes in the images, and recovering the information.

Figure 37:
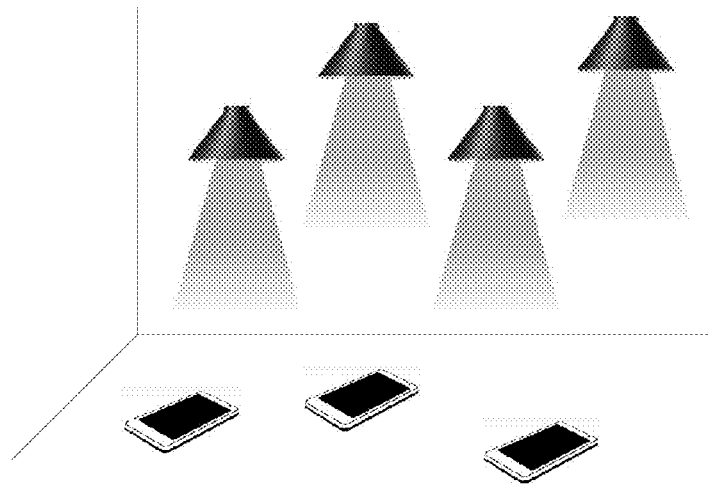
FIG. 37 is a schematic diagram of a positioning system based on the visible light signals according to an embodiment of the present invention.

According to embodiments of the present invention, it provides a positioning system based on the visible light signal as shown in FIG. 37. Optionally, the device for obtaining information from visible light signals comprising an image sensor may be a mobile device containing photosensitive components. Optionally, such mobile device could be a smartphone. The light source (e.g., in a transmitter) may be modulated to emit the above mentioned visible light signal; the emitted visible light signal contains the unique ID of the corresponding light source; an image sensor in the smartphone, captures images of the light sources, measures the varied number of bright or dark stripes in these images, decodes the ID information, and compares the decoded ID with the data stored in a map database. In this way, the accurate position of the image sensor can be determined from the position of the light source.

In conclusion, the embodiments of the present invention provide an efficient and effective approach for transmitting/obtaining information, which can transmit/obtain information much faster and more accurate, and the information transmitted/obtained may contain more data bits. Further, the embodiments of the present invention effectively avoid the undesirable blinking of the light source detectable by human eyes.

It should be noted that the aforesaid embodiments are exemplary rather than limiting the present invention, substitute an alternative embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. In the apparatus claims that list several components, several ones among these components can be specifically embodied in the same hardware item. The use of such words as first, second, third does not represent any order, which can be simply explained as names.

The invention claimed is:

1. A method for transmitting information by visible light signal from a light source, the method comprising:
   modulating, on the basis of the information to be transmitted, a driving signal of the light source to obtain a modulated driving signal for driving the light source to emit a visible light signal having its level changed between a peak level and a bottom level with varied frequencies at different time points; and
   emitting the visible light signal having its level changed between a peak level and a bottom level with varied frequencies at different time points on the basis of the modulated driving signal, so as to transmit information corresponding to varied numbers of bright or dark stripes shown in one or more images obtained from the visible light signal at one or more time points, which numbers are corresponding to the varied frequencies.

2. The method according to claim 1, wherein modulating on the basis of the information to be transmitted a driving signal of the light source to obtain a modulated driving signal comprises: modulating on the basis of the information to be transmitted a driving voltage or a driving current of the light source to obtain a first modulated driving voltage or a first modulated driving current.

3. The method according to claim 2, wherein the first modulated driving current is greater than an un-modulated driving current, so that luminous flux of the light source driven by the first modulated driving current is equal to luminous flux of the light source driven by the un-modulated driving current.

4. The method according to claim 2, further comprising: emitting the visible light signal on the basis of a second modulated driving current which is greater than an un-modulated driving current together with a high frequency carrier wave signal, so that luminous flux of the light source driven by the second modulated driving current is constant among periods comprising peak levels and bottom levels.

5. The method according to claim 2, wherein the first modulated driving voltage or the first modulated driving current is used for driving the light source to emit a visible light signal with a frequency from 100 Hz to 1.37 MHz, and a duration of each bottom level of the visible light signal is fixed, or a duration of each peak level of the visible light signal is fixed.

6. The method according to claim 1, further comprising:
detecting the absence or presence of a human being within an illumination scope of the light source; and
emitting a visible light signal on the basis of an un-modulated driving signal in the absence of a human being.

7. The method according to claim 1, wherein the information corresponding to the varied numbers of bright or dark stripes comprises data bits which comprise data corresponding to the varied frequencies, and each data bit corresponds to a number among the varied numbers of bright or dark stripes.

8. The method according to claim 7, wherein the information corresponding to the varied numbers of bright or dark stripes further comprises one or more start bits and/or one or more error correction bits, the one or more start bits being used to identify a start position of a set of data bits, and the one or more error correction bits being used to check error in the data bits.

9. A method for obtaining information from visible light signals, the method comprising:
obtaining one or more images at one or more time points from a visible light signal having its level changed between a peak level and a bottom level with varied frequencies at different time points emitted by a light source;
measuring varied numbers of bright or dark stripes in the one or more images, the varied numbers of bright or dark stripes corresponding to the varied frequencies; and
obtaining information corresponding to the varied numbers of the bright or dark stripes.

10. The method according to claim 9, wherein obtaining one or more images comprises obtaining the one or more images by an image capturing device comprising an image sensor whose exposure mode is rolling shutter mode, and a sampling rate of the rolling shutter is higher than a frame rate of the image sensor.

11. The method according to claim 9, wherein obtaining one or more images comprises capturing on an image sensor with a rolling shutter the one or more images in which different portions of the image sensor are exposed at different time points.

12. The method according to claim 9, wherein the visible light signal is emitted by the light source on the basis of a modulated driving signal, which drives the light source to emit the visible light signal having its level changed between a peak level and a bottom level with varied frequencies at different time points.

13. The method according to claim 9, wherein the light source is one or more light sources, and
obtaining one or more images at one or more time points from the visible light signal having its level changed between a peak level and a bottom level with varied frequencies at different time points emitted by a light source comprises: obtaining one or more images at one or more time points from the visible light signal having its level changed between a peak level and a bottom level with varied frequencies at different time points emitted by the one or more light sources, wherein one or more exposed regions in each image correspond to the one or more light sources,
measuring varied numbers of bright or dark stripes in the one or more images comprises: measuring the varied numbers of the bright or dark stripes of the one or more exposed regions in each image, and
obtaining information corresponding to the varied numbers of the bright or dark stripes comprises: obtaining information corresponding to the varied numbers of the bright or dark stripes of the one or more exposed regions in each image.

14. The method according to claim 9, wherein the information corresponding to the varied numbers of bright or dark stripes comprises data bits which comprise data corresponding to the varied frequencies, and each data bit corresponds to a number among the varied numbers of bright or dark stripes.

15. The method according to claim 14, wherein the information corresponding to the varied numbers of bright or dark stripes further comprises one or more start bits and/or one or more error correction bits, the one or more start bits being used to identify a start position of a set of data bits, and the one or more error correction bits being used to check error in the data bits.

16. A light source for transmitting information by visible light signal, comprising:
a modulator configured to modulate, on the basis of the information to be transmitted, a driving signal of the light source to obtain a modulated driving signal for driving the light source to emit visible light signal having its level changed between a peak level and a bottom level with varied frequencies at different time points; and
an emitter configured to emit the visible light signal having its level changed between a peak level and a bottom level with varied frequencies at different time points on the basis of the modulated driving signal, so as to transmit information corresponding to varied numbers of bright or dark stripes shown in one or more images obtained from the visible light signal at one or more time points, which numbers are corresponding to the varied frequencies.

17. The light source according to claim 16, wherein the modulator is configured to modulate on the basis of the information to be transmitted a driving voltage or a driving current of the light source to obtain a first modulated driving voltage or a first modulated driving current.

18. The light source according to claim 17, wherein the first modulated driving current is greater than the un-modulated driving current, so that luminous flux of the light source driven by the first modulated driving current is equal to luminous flux of the light source driven by the un-modulated driving current.

19. The light source according to claim 17, wherein the emitter is configured to emit the visible light signal on the basis of a second modulated driving current which is greater than an un-modulated driving current together with a high frequency carrier wave signal, so that luminous flux of the light source driven by the second modulated driving current is constant among periods comprising peak levels and bottom levels.

20. The light source according to claim 17, wherein the first modulated driving voltage or the first modulated driving current is used for driving the light source to emit a visible light signal with a frequency from 100 Hz to 1.37 MHz, and a duration of each bottom level of the visible light signal is fixed, or a duration of each peak level of the visible light signal is fixed.

21. The light source according to claim 16, further comprising:
- a detector configured to detect the absence or presence of a human being within an illumination scope of the light source; and
- wherein the emitter is configured to emit a visible light signal on the basis of an un-modulated driving signal in the absence of a human being.

22. The light source according to claim 16, wherein the information corresponding to the varied numbers of bright or dark stripes comprises data bits which comprise data corresponding to the varied frequencies, and each data bit corresponds to a number among the varied numbers of bright or dark stripes.

23. The light source according to claim 22, wherein the information corresponding to the varied numbers of bright or dark stripes further comprises one or more start bits and/or one or more error correction bits, the start bits being used to identify a start position of a set of data bits, and the one or more error correction bits being used to check error in the data bits.

24. A device for obtaining information from visible light, comprising:
- an image sensor configured to obtain one or more images at one or more time points from a visible light signal having its level changed between a peak level and a bottom level with varied frequencies at different time points emitted by a light source;
- a memory configured to store the one or more images obtained by the image sensor at one or more time points; and
- a processor configured to measure varied numbers of bright or dark stripes in the one or more images stored in the memory and obtain information corresponding to the varied numbers of the bright or dark stripes, the varied numbers of bright or dark stripes corresponding to the varied frequencies.

25. The device according to claim 24, wherein an exposure mode of the image sensor is rolling shutter mode, and a sampling rate of the rolling shutter is higher than a frame rate of the image sensor.

26. The device according to claim 24, wherein the image sensor is an image sensor with a rolling shutter and is configured to obtain the one or more images in which different portions of the image sensor are exposed at different time points.

27. The device according to claim 24, wherein the visible light signal is emitted by the light source on the basis of a modulated driving signal, which drives the light source to emit the visible light signal having its level changed between a peak level and a bottom level with varied frequencies at different time points.

28. The device according to claim 24, wherein the light source is one or more light sources, and
- the image sensor is configured to obtain one or more images at one or more time points from visible light signal having its level changed between a peak level and a bottom level with varied frequencies at different time points emitted by the one or more light sources, wherein one or more exposed regions in each image correspond to the one or more light sources,
- the memory is configured to store the one or more images obtained by the image sensor at one or more time points; and
- the processor is configured to measure the varied numbers of the bright or dark stripes of the one or more exposed regions in each image, and obtain information corresponding to the varied numbers of the bright or dark stripes of the one or more exposed regions in each image.

29. The device according to claim 24, wherein the information corresponding to the varied numbers of bright or dark stripes comprises data bits which comprise data corresponding to the varied frequencies, and each data bit corresponds to a number among the varied numbers of bright or dark stripes.

30. The device according to claim 29, wherein the information corresponding to the varied numbers of bright or dark stripes further comprises one or more start bits and/or one or more error correction bits, the one or more start bits being used to identify a start position of a set of data bits, and the one or more error correction bits being used to check error in the data bits.

* * * * *